(12) United States Patent
Radkiewicz et al.

(10) Patent No.: US 10,796,235 B2
(45) Date of Patent: Oct. 6, 2020

(54) COMPUTER SYSTEMS AND METHODS FOR PROVIDING A VISUALIZATION OF ASSET EVENT AND SIGNAL DATA

(71) Applicant: Uptake Technologies, Inc., Chicago, IL (US)

(72) Inventors: Jacob Radkiewicz, Oswego, IL (US); Ralph Brendler, Arlington Heights, IL (US); Molli Simpson, San Francisco, CA (US)

(73) Assignee: Uptake Technologies, Inc., Chicago, IL (US)

( * ) Notice: Subject to any disclaimer, the term of this patent is extended or adjusted under 35 U.S.C. 154(b) by 193 days.

(21) Appl. No.: 15/469,109

(22) Filed: Mar. 24, 2017

(65) Prior Publication Data

US 2017/0276573 A1 Sep. 28, 2017

Related U.S. Application Data

(60) Provisional application No. 62/313,560, filed on Mar. 25, 2016.

(51) Int. Cl.
*G06N 5/04* (2006.01)
*G06Q 10/00* (2012.01)
*G06N 5/02* (2006.01)

(52) U.S. Cl.
CPC .............. *G06N 5/04* (2013.01); *G06N 5/025* (2013.01); *G06Q 10/00* (2013.01); *G06Q 10/20* (2013.01)

(58) Field of Classification Search
CPC ........ G06N 5/04; G06Q 10/20; G01M 99/008
See application file for complete search history.

(56) References Cited

U.S. PATENT DOCUMENTS

| 5,566,092 A | 10/1996 | Wang et al. |
| 5,633,800 A | 5/1997 | Bankert et al. |
| 6,256,594 B1 | 7/2001 | Yamamoto et al. |

(Continued)

FOREIGN PATENT DOCUMENTS

| EP | 2778872 A2 | 2/2014 |
| EP | 2801935 | 11/2014 |

(Continued)

OTHER PUBLICATIONS

International Searching Authority International Search Report and Written Opinion dated Jun. 26, 2017, issued in connection with International Application No. PCT/US2017/024254, filed Mar. 27, 2017, 13 pages.

(Continued)

*Primary Examiner* — Toan M Le
(74) *Attorney, Agent, or Firm* — Lee Sullivan Shea & Smith LLP

(57) ABSTRACT

Disclosed herein are computer systems, devices, and methods for improving the technology related to asset condition monitoring. In accordance with the present disclosure, an asset data platform may be configured to receive data related to asset operation, ingest, process, and analyze the received data, and then provide a set of advanced tools that enable a user to monitor asset operation and take action based on that asset operation. The set of advanced tools may include (1) an interactive visualization tool, (2) a task creation tool, (3) a rule creation tool, and/or (4) a metadata tool.

20 Claims, 13 Drawing Sheets

(56) References Cited

U.S. PATENT DOCUMENTS

| | | |
|---|---|---|
| 6,336,065 B1 | 1/2002 | Gibson et al. |
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,112,425 B2 | 2/2012 | Baum et al. |
| 8,145,578 B2 | 3/2012 | Pershing et al. |
| 8,185,355 B2 | 5/2012 | Nath et al. |
| 8,214,370 B1 | 7/2012 | Turon et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,508 B1 | 9/2012 | Adams et al. |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0181712 A1 | 9/2004 | Taniguchi et al. |
| 2004/0243636 A1 | 12/2004 | Hasiewicz et al. |
| 2005/0060323 A1 | 3/2005 | Leung |
| 2005/0119905 A1 | 6/2005 | Wong et al. |
| 2005/0222747 A1 | 10/2005 | Vhora et al. |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2010/0114838 A1 | 5/2010 | Pirtle |
| 2010/0211618 A1 | 8/2010 | Anderson et al. |
| 2011/0106734 A1 | 5/2011 | Boult |
| 2011/0144795 A1 | 6/2011 | Liu |
| 2012/0253889 A1 | 10/2012 | Davidson et al. |
| 2012/0271612 A1 | 10/2012 | Barsoum et al. |
| 2012/0290497 A1 | 11/2012 | Magara |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0066886 A1 | 3/2013 | Bagchi |
| 2013/0212420 A1* | 8/2013 | Lawson ............ G05B 19/4185 713/400 |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0025414 A1 | 1/2014 | Worden et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0121973 A1 | 5/2014 | Buchanan |
| 2014/0169398 A1 | 6/2014 | Arndt et al. |
| 2014/0170617 A1 | 6/2014 | Johnson et al. |
| 2014/0172866 A1 | 6/2014 | Lin et al. |
| 2014/0184643 A1 | 7/2014 | Friend |
| 2014/0222355 A1 | 8/2014 | Cheim et al. |
| 2014/0279948 A1 | 9/2014 | Mahate et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0082221 A1 | 3/2015 | Noel et al. |
| 2015/0262060 A1 | 9/2015 | Husain et al. |
| 2016/0019558 A1 | 1/2016 | Bridy |
| 2016/0085755 A1 | 3/2016 | Fankhauser et al. |
| 2016/0253563 A1 | 9/2016 | Lam |
| 2016/0358041 A1 | 12/2016 | Venkataraman |
| 2017/0051978 A1 | 2/2017 | Pal |
| 2017/0085696 A1 | 3/2017 | Abkairov |
| 2017/0097860 A1 | 4/2017 | Pang |
| 2017/0233105 A1* | 8/2017 | Vali .................. G06Q 10/06 701/3 |

FOREIGN PATENT DOCUMENTS

| | | |
|---|---|---|
| KR | 20140108499 | 9/2014 |
| WO | 2011117570 | 9/2011 |
| WO | 2013034420 | 3/2013 |

(56) References Cited

FOREIGN PATENT DOCUMENTS

| WO | 2014052921 | 4/2014 |
|---|---|---|
| WO | 2014145977 | 9/2014 |
| WO | 2014205497 | 12/2014 |

OTHER PUBLICATIONS

Biswas, "Redundancy-based Approaches in Wireless Multihop Network Design", PhD Dissertation Submitted to Graduate Faculty of North Carolina State University (2014), 154 pages.
Isermann, "Model-based Fault Detection and Diagnosis—Status and Applications", Institute of Automatic Control, Darmstadt University of Technology (2004), 12 pages.
Narasimhan et al, "Combining Model-Based and Feature-Driven Diagnosis Approaches—A Case Study on Electromechanical Actuators", 21st International Workshop on Principles of Diagnosis (2010), 8 pages.
Prentzas et al, "Categorizing Approaches Combining Rule-Based and Case-Based Reasoning", 34 pages, 2007.
Infor M3 Enterprise Management System, Infor.com (2014), 4 pages.
Infor Equipment, Infor.com (2012), 4 pages.
Infor Introduces Next-Generation Solution for Equipment Dealers and Service Providers, Infor.com (Feb. 20, 2014), 5 pages.
Infor Equipment for Rental, Infor.com (2013), 8 pages.
Waltermire et al, Applying the Continuous Monitoring Technical Reference Model to the Asset, Configuration, and Vulnerability Management Domains (Draft), NIST (Jan. 2012), 29 pages.
Sherding et al, "Improving Distribution Reliability with Smart Fault Indicators and the PI System", Users Conference, OSIsoft, LLC (2015), 25 pages.
European Patent Office Extended Search Report for EP Application No. 17771308.8 dated Jul. 8, 2019, 10 pages.
European Patent Office Extended Search Report for EP Application No. 17771309.6 dated Aug. 8, 2019, 7 pages.
Intellectual Property Office of Singapore, Written Opinion dated Mar. 26, 2020, issued in connection with Singapore App. No. 11201808139P, filed Mar. 27, 2017, 8 pages.

* cited by examiner

| Granularity | Start Time | Signal Summary |
|---|---|---|
| $G_1$ | $T_0$ | $Min_1, Max_1, Av_1, Med_1$ |
| $G_1$ | $T_1$ | $Min_2, Max_2, Av_2, Med_2$ |
| $G_1$ | $T_2$ | $Min_3, Max_3, Av_3, Med_3$ |
| $G_2$ | $T_0$ | $Min_4, Max_4, Av_4, Med_4$ |
| $G_1$ | $T_3$ | $Min_5, Max_5, Av_5, Med_5$ |
| $G_1$ | $T_4$ | $Min_6, Max_6, Av_6, Med_6$ |
| $G_1$ | $T_5$ | $Min_7, Max_7, Av_7, Med_7$ |
| $G_2$ | $T_3$ | $Min_8, Max_8, Av_8, Med_8$ |
| $G_3$ | $T_0$ | $Min_9, Max_9, Av_9, Med_9$ |
| $G_1$ | $T_6$ | $Min_{10}, Max_{10}, Av_{10}, Med_{10}$ |
| $G_1$ | $T_7$ | $Min_{11}, Max_{11}, Av_{11}, Med_{11}$ |
| $G_1$ | $T_8$ | $Min_{12}, Max_{12}, Av_{12}, Med_{12}$ |
| $G_2$ | $T_6$ | $Min_{13}, Max_{13}, Av_{13}, Med_{13}$ |

FIGURE 7B

Create Recommendation

Recommendation Name

Equipment Details

Problem        Recommended Action

Recommendation Cost

Supplemental Information

Browse

Add File

Relevant articles        Search

Recommended Articles
1) Article 1, Summary: Lorem ipsum dolor sit amet, consectetur adipiscing elit ...
2) Article 2, Summary: Lorem ipsum dolor sit amet, consectetur adipiscing elit ...
3) Article 3, Summary: Lorem ipsum dolor sit amet, consectetur adipiscing elit ...
4) Article 4, Summary: Lorem ipsum dolor sit amet, consectetur adipiscing elit ...

COMPUTER SYSTEMS AND METHODS FOR PROVIDING A VISUALIZATION OF ASSET EVENT AND SIGNAL DATA

CROSS-REFERENCE TO RELATED APPLICATION

This application claims priority to U.S. Provisional Patent Application No. 62/313,560, filed on Mar. 25, 2016, entitled Asset-Related Interactive Tools, which is incorporated by reference in its entirety.

BACKGROUND

Today, machines (referred to herein as "assets") are ubiquitous in many industries to the modern economy. From locomotives that transfer cargo across countries to farming equipment that harvest crops, assets play an important role in everyday life. Depending on the role that an asset serves, its complexity, and cost may vary. For instance, some assets may include multiple subsystems that must operate in harmony for the asset to function properly (e.g., an engine, transmission, etc. of a locomotive).

Because of the increasing role that assets play, it is also becoming increasingly desirable to repair assets with limited downtime. To facilitate this, some have developed mechanisms to monitor asset conditions and detect abnormal conditions at an asset to facilitate repairing the asset, perhaps with little downtime.

OVERVIEW

One approach for monitoring assets generally involves an on-asset computer that receives signals from various sensors and/or actuators distributed throughout the asset that monitor the operating conditions of the asset. As one representative example, if the asset is a locomotive, the sensors and/or actuators may monitor parameters such as temperatures, pressures, fluid levels, voltages, and/or speeds, among many other examples. If the signals output by one or more of the sensors and/or actuators reach certain values, the on-asset computer may then generate an abnormal-condition indicator, such as a "fault code," which is an indication that an abnormal condition has occurred within the asset and repair or maintenance may be needed.

In general, an abnormal condition may be a defect at an asset or component thereof, which may lead to a failure of the asset and/or component. As such, an abnormal condition may be associated with a given failure, or perhaps multiple failures, in that the abnormal condition is symptomatic of the given failure or failures. In practice, a user typically defines the sensors and respective sensor values associated with each abnormal-condition indicator. That is, the user defines an asset's "normal" operating conditions (e.g., those that do not trigger fault codes and "abnormal" operating conditions (e.g., those that trigger fault codes).

The on-asset computer may also be configured to monitor for, detect, and generate data indicating other events that may occur at the asset, such as asset shutdowns, restarts, etc.

An asset may then be configured to send certain operating data for the asset, such as sensor/actuator data, abnormal-condition indicators, and/or other asset event indicators, to a remote location such as an asset condition monitoring system, which may perform analysis on such data and/or cause information regarding asset operation to be output to a user.

Disclosed herein are systems, devices, and methods for improving the technology related to asset condition monitoring. In accordance with example embodiments, an asset data platform may be configured to receive data related to asset operation, ingest, process, and analyze the received data, and then facilitate providing one or more tools that enable a user to monitor asset operation and take action based on that asset operation.

Typically, in the asset-condition-monitoring space, the sheer amount of signal data (e.g., sensor and/or actuator data) and asset-related event data (e.g., machine events, fluid analysis events, diagnostic events, etc.) creates numerous challenges for displaying visualizations of such data. Moreover, when such data is visually displayed, a user is generally required to sift through a vast amount of irrelevant or otherwise uninteresting information before identifying useful information. Furthermore, the high volume of data required to output such visual displays tends to stress the storage capabilities of asset data platforms and leads to longer than ideal processing times.

One example tool may take the form of an interactive visualization tool that may display both asset-event data and related signal data for an asset (or a group of assets) in a timeline view. In example embodiments, the interactive visualization tool may take the form of a software application (e.g., a web application provided by the asset data platform or a native application) that runs on a client station, such as a personal computer, smartphone, or the like. The client station may receive data for the interactive visualization tool from an asset data platform. While the below discusses operations related to the interactive visualization tool that are performed by an asset data platform, it should be understood that such operations may wholly or partially be performed by a computing system independent of an asset data platform.

The interactive visualization tool and asset data platform may help to overcome the aforementioned problems involved with handling large amounts of asset-related data. For instance, the asset data platform may be configured to process and maintain asset-related data in an efficient manner by aggregating asset-related data over time, as discussed below. Moreover, the interactive visualization tool may provide an intuitive interface by which asset-related data may be displayed and/or manipulated in a user-friendly manner.

As one example embodiment, the asset data platform may obtain asset-related data from various sources, such as an asset, another asset data platform, and/or some other third party data source (e.g., fluid analysis data, diagnostic data, maintenance data, repair data, weather data, job site data, etc.), among other sources. The asset-related data may take a number of forms, such as signal data, which may indicate a raw value measured by a sensor/actuator, or event data, which may indicate the type, time, and/or duration of an asset-related event. Other forms of asset-related data are possible. Generally, an asset-related event is an event related to asset operation, where the event is defined by one or more conditions that affect or reflect operation of an asset. Examples of events include an abnormal-condition indicator (e.g., a fault code) being triggered, an asset rule being triggered, an asset or part thereon being repaired, an asset being shutdown or restarted, diagnostics being run, and fluid analysis indicating an above normal concentration of a particle in asset fluid, among other examples.

After the asset data platform obtains asset-related data, the asset data platform may process and/or maintain the asset-related data in various manners. For instance, the asset data platform may utilize the asset-related data to generate and store in one or more databases "event snapshot" data. In particular, the asset data platform may receive event data indicating the occurrence of an asset-related event and based on the occurrence, capture signal data related to the received event at or around the time of the occurrence and create an "event snapshot" that may include an indication of the event type, the time, and/or the duration of the event, along with the captured signal data. An event snapshot may take other forms as well.

Additionally or alternatively, the asset data platform may be configured to create aggregated signal data representative of signal data over various resolutions of time (e.g., each minute, each hour, each day, etc.) based on received asset-related data. In practice, the asset data platform may receive respective signal data for one or more assets, and the signal data for any given asset may include signal data from one or more sensors and/or actuators of that given asset. The asset data platform may receive such asset-related data continuously, periodically, or on some other basis, which may result in the asset data platform handling a large amount of data.

Accordingly, the asset data platform may be configured to generate aggregated signal data for each asset for one or more predefined resolutions of time, where the aggregated signal data for a given resolution of time includes a signal summary for the resolution of time. The asset data platform may perform this operation in a variety of manners.

In one example embodiment, the asset data platform may receive signal data once a second for a given asset where that signal data includes values measured by a given sensor of the given asset. Once the asset data platform receives a predefined amount of data, for example, a minute's worth of signal data, the asset data platform may then determine a signal summary that reflects the measured sensor values for that minute's worth of data.

In practice, a given signal summary may include one or multiple values representative of the particular signal's value over the particular amount of time. For example, a given signal summary may include one or more of the following values that are determined from the signal data for the particular amount of time: average, median, maximum, minimum, variance, first signal data, and/or last signal data value, among other possibilities.

After the signal summary is generated, the asset data platform may then store the determined aggregated signal data in a database (e.g., the "minute" aggregated signal database) or a location within a database that is for the aggregated data for the particular resolution of time (e.g., the "minute" aggregated signal table within a database). Alternatively, in example embodiments, the aggregated signal data for a given timeframe (e.g., every 24 hours) may be stored in a single data structure (e.g., a single data table) such that aggregated data for different resolutions of time are stored in one location, which may advantageous for scaling purposes. In any event, the asset data platform may continue to perform these aggregation operations each time it receives another minute's worth of signal data. In this way, the asset data platform may store less data for a given amount of time but retain useful information.

As suggested above, the asset data platform may perform the above operations for each single source (e.g., sensor/actuator) of the given asset and for a plurality of assets. Moreover, the asset data platform may include multiple aggregated signal databases, each of which storing aggregate signal data for a given resolution of time. That is, each aggregated signal database may correspond to a different granularity. For instance, there may be a one-second, five-second, fifteen-second, one-minute, one-hour, one-day, one-week, and/or one-month aggregated signal database, among other examples. Alternatively, as discussed above, the asset data platform may store aggregated signal data for different granularities in one data structure (e.g., a single data table) for a certain timeframe (e.g., one table for every 24 hours).

In example embodiments, aggregated signal data may be determined in line with the above discussion, regardless of the resolution of time for which the signal data is being aggregated. While in other example embodiments, an aggregated signal data for a given resolution of time may be determined based on aggregated signal data for another resolution of time. For instance, a signal summary for an hour's worth of data may be determined based on signal summaries for one-minute aggregations for that same hour timeframe. Other examples are also possible.

In this respect, the asset data platform may be further configured to discard and/or archive signal data and/or aggregated signal data, which may occur in a number of manners. In example embodiments, the asset data platform may discard certain data based at least on the nature of the database in which the data is stored and a predefined amount of time. For example, the asset data platform may discard data stored in a "real-time" database (e.g., a database that continuously receives and stores signal data) that is older than, for example, thirty-days old. In some such cases, the "discarded" data may be archived in data storage located remote from the asset data platform. Additionally or alternatively, the asset data platform may discard data stored in certain aggregated signal databases that is older than, for example, sixty-days old. For instance, the asset data platform may be configured to discard data that is sixty-days old and stored in, for example, the one-second, five-second, fifteen-second, and one-minute aggregated-signal databases, but may be configured to retain the data regardless of that data's age that is stored in less granular databases, such as the one-hour, one-day, one-week, one-month, etc. aggregated signal databases. Other data-storage functions are also possible.

The asset data platform may further be configured to utilize the aforementioned "event snapshot" data and aggregated signal data to cause the interactive visualization tool to display a visual representation of the asset events and aggregated signal data. In one example implementation, the asset data platform may populate the timeline with event-related data based on the asset data platform receiving data indicative of one or more user inputs at the interactive visualization tool. For instance, a user may first launch the interactive visualization tool at his/her client station (e.g., by pressing an icon associated with the tool), then the interactive visualization tool may receive an input that selects a particular asset or group of assets, a timeframe of interest (e.g., a date range), and/or one or more asset-related event types, among other possible filter criteria.

Based upon such selection(s), the interactive visualization tool may send to the asset data platform data indicative of such selection(s). In turn, the asset data platform may then access one or more databases that contain asset-related data (e.g., "event snapshot" data and/or aggregated signal data) for the particular asset or group of assets. The asset data platform may perform this operation in a variety of manners.

As one example, a query may be generated based on the selection(s) to cause the asset data platform to first access one or more databases comprising "event snapshot" data in order to identify instances within the selected timeframe of interest at which the selected asset-related event types occurred for the particular asset or group of assets and obtain some signal data related to the given event from the event snapshot data. The asset data platform may then identify from the matching "event snapshot" data additional characteristics of each event occurrence, such as the time at which the event occurred and/or relevant sensors/actuators associated with the event occurrence, among other possibilities.

Next, the asset data platform may use the event characteristics that were identified from the "event snapshot" data to access one or more aggregated signal data sources to identify additional signal data corresponding to the identified events within the selected timeframe. In some example embodiments, the asset data platform may utilize all relevant aggregated data for the selected timeframe, while in other examples the asset data platform may only utilize the relevant aggregated data within the selected timeframe that does not temporally overlap with the "event snapshot" data. The retrieval of asset-related data corresponding to the selections may be employed in various other fashions.

In any event, after retrieving the "event snapshot" data and aggregated signal data, the asset data platform may cause the timeline of the interactive visualization tool to display an indication of the identified asset-related events and corresponding signal data. In practice, this information may be displayed in a variety of manners.

For example, indications of the events and corresponding signal data may either be displayed overlaid upon one another or in two separate panes that share a common timeline axis. In either case, the indications of the events and corresponding signal data may be displayed utilizing multiple y-axes and the signal data from various sensors/actuators may be displayed overlaid or separate from one another. Furthermore, the interactive visualization tool may be configured to allow a user, the tool, and/or asset data platform to highlight or otherwise indicate particular signal parameters and/or event instances that may be deemed to be of potential interest to a user. The visualization may be presented in a number of different forms incorporating various other interface elements.

In some example implementations, the asset data platform may access different databases, data structures within a given database, and/or entries within a given data structure to obtain particular data to populate the timeline of the interactive visualization tool based on an input to a scrubber element associated with the timeline. In some cases, the scrubber element may take the form of a slide-able or otherwise adjustable element that may be selected to zoom in or out of a displayed timeline view, which may cause the asset data platform to provide signal data from different locations. In other words, the asset data platform may access different aggregated data for a particular asset or a group of assets based on a scrubber input. For example, a zoom in input may cause the asset data platform to access aggregated signal data for each minute and/or hour, while a zoom out input may cause the asset data platform to access aggregated signal data for each day or month. The asset data platform may then cause the timeline to populate accordingly based on aggregated data corresponding to a particular granularity. The variable display of aggregated data values in the timeline view may be implemented in other ways as well.

Another example tool may take the form of a task creation tool that may leverage one or more predictive models in order to output one or more task-field suggestions that may be used in the creation of an asset-related task. Similar to the interactive visualization tool discussed above, the task creation tool may be a software application (e.g., a web application provided by the asset data platform or a native application) that runs on a client station and receives data from the asset data platform. In practice, a first user (e.g., the "task creator") might utilize the task creation tool to create a particular task that is then provided to a second user (e.g., a mechanic or the like) that may or may not carry out the task.

Generally, the task creation tool facilitates creating a task that attempts to address the occurrence of one or more particular events of a given asset. For instance, a task might include one or more recommended repairs or maintenance that a mechanic or the like should attempt on a given asset to address an over-heating engine. As such, for a given task, the task creation tool is configured to provide a number of task-fields that may be user or machine populated (e.g., the task creation tool, the asset data platform, or some combination thereof). Examples of task fields include an asset identifier, asset-event identifiers, recommended action(s), recommended literature (e.g., repair manuals, component specifications, asset schematics, etc.) repair costs, and inaction costs, among numerous other possibilities. Depending on the particular task, additional or fewer task-fields may be provided.

In practice, a user may provide one or more inputs at the task creation tool to create an asset-related task. For instance, the user may first select at the task creation tool an indication of a particular asset, which may in turn cause the asset data platform to retrieve for the selected asset a set of events that previously occurred. The asset data platform may then cause the task creation tool to display an indication of the retrieved event occurrences.

Once the events that previously occurred are displayed, the task creation tool may be further configured to receive an input selecting one or more of the indications of the events followed by one or more inputs to create a task. The input to create the task may take various forms and generally dictates how the task creation tool populates task fields.

For instance, the task creation tool may display one or more user-selectable elements (e.g., icons) that each correspond to a different way to create a given task. In a first example, the task creation tool may receive, via a first user-selectable element, a first input indicating that a user desires to manually create a task. That is, the user may prefer to populate the task fields displayed by the task creation tool. In such a case, the task creation tool may display blank task fields in response to receiving the first input.

In another example, the task creation tool may receive, via a second user-selectable element, a second input indicating that a user desires to receive suggested tasks. In such a case, the task creation tool may facilitate the transmission of a request to the asset data platform to execute one or more predictive models in response to receiving the second input. In turn, the asset data platform may provide back to the tool one or more suggested tasks for the particular asset based on executing one or more predictive models with signal data and/or event data for the particular asset. The task creation tool may then display the one or more suggested tasks, at which point the user may accept, modify, or decline the suggested tasks. Alternatively, the task creation tool may include a "setting" or the like that the user can select that causes the task creation tool to receive suggested tasks from the asset data platform.

In yet another example, the task creation tool may receive an input that causes the task creation tool to instruct the asset data platform to execute one or more predictive models in order to populate certain task fields for a given task. As one example, the asset data platform may be configured to execute one or more predictive models that receive as inputs one or more events for the particular asset and output a ranked list of knowledge articles (e.g., repair manuals, parts specifications, cost breakdowns etc.). In this example, an indication of the ranked list of knowledge articles may then populate the recommended literature task field displayed by the task creation tool.

In any event, as suggested above, the task creation tool may be further configured to facilitate transmitting a created task to another computing device(s) for the purpose of allowing one or more additional users to take action in regard to the task (e.g., implement a recommended action). Additionally or alternatively, the task creation tool may be configured to facilitate causing one or more actions to be triggered based on a created task, such as scheduling a repair corresponding to the recommended action, among other examples.

Yet another example tool may take the form of a rules creation tool configured to facilitate creating new asset-related rules that may be applied at the asset data platform to trigger an event. Similar to the above-discussed tools, the rules creation tool may take the form of a software application (e.g., a web application provided by the asset data platform or a native application) that runs on a client station.

In practice, the asset data platform may store and monitor one or more asset-related rules for a given asset or set of assets, where each rule includes respective triggering conditions. For example, an asset-related rule may be a hi-low threshold rule, where an event is triggered based on a signal measurement (e.g., a sensor and/or actuator measurement) or a combination of signal measurements either exceeding or falling below a threshold level. In another example, an asset-related rule may be a rate of change rule, where an event is triggered based on one or more signal measurements varying by a certain degree over a period of time (e.g., rate of change threshold). Other example asset-related rules are possible as well.

Traditionally, such rules may be defined when the asset data platform is first implemented or when the organization whose assets the rules apply to first starts utilizing the asset data platform and/or such rules may only be modified by, for example, an administrator of the asset data platform. The rules creation tool described herein may allow for dynamic creation and/or modification of asset-related rules and/or may allow individuals other than the administrator to make changes.

The rules creation tool may facilitate creating asset-related rules in a number of ways. In one implementation, the rules creation tool may create asset-related rules based on user inputs at the rules creation tool. That is, the rules creation tool may include one or more rule fields that a user may populate and a selectable element that causes the rule to be created based on the populated fields and content therein. For example, a user may first identify asset(s), signal types, and threshold values(s) for the selected signal types via respective rule fields and then provide an input indicating that a new asset-related rule should be created based on the selections.

Additionally or alternatively, the rules creation tool in combination with the asset data platform may be configured to recommend a new asset-related rule, which may then be displayed to a user via the rules creation and then accepted, modified, or declined. In example implementations, the asset data platform may recommend a new asset-related rule for a given organization based on various analytics, such as an analysis of asset-related rules created by other organizations that monitor similar assets. New asset-related rules may be dynamically created based other possible factors.

In any event, the rules creation tool may cause the asset data platform to store the asset related rule in one or more rule databases. The asset data platform may then subsequently apply the stored rule to asset-related data for assets of the particular organization and trigger an event when the conditions of any stored rule is triggered. That is, the asset data platform may check received asset-related data against the rule parameters (e.g., asset(s), signal type(s), threshold value(s)) in order to determine whether or not to trigger an event corresponding to the created rule.

Still another example tool may take the form of a metadata tool that may be configured to associate additional asset information with an asset(s) identifier(s), which may help make identifying asset-related data of interest or trends thereof more efficient. Similar to the above-discussed tools, the metadata tool may take the form of a software application (e.g., a web application provided by the asset data platform or a native application) that runs on a client station.

Generally, the asset data platform may associate received asset-related data (e.g., signal data, event data, etc.) with a particular asset via an asset identifier that may accompany such asset-related data when transmitted to the asset data platform. In this respect, the asset data platform may maintain one or more databases that contain entries that correlate received asset-related information to each of the asset identifiers. In one example, the information contained in an entry for an asset identifier may include an asset type (e.g., train, airplane, etc.), model, serial number, asset age, among other possibilities. As seen from the aforementioned example, the asset information associated with an asset identifier is typically related to permanent features of the asset (i.e., what the asset is).

The metadata tool disclosed herein enables the asset data platform to associate additional information with an asset identifier that may be of a more temporary in nature. For example, the asset data platform, via the metadata tool, may associate with an asset identifier information regarding the identity of an operator(s) (e.g., driver, engineer, pilot, etc.) of an asset at given time, the location of an asset at a given time or times, and/or weather conditions experienced by an asset, among various other possibilities.

The metadata tool may be operable to facilitate the association of additional information with an asset identifier in various ways. For example, the metadata tool may be configured to provide various metadata fields and thereby receive user inputs regarding additional data the user desires to be associated with a particular asset identifier. In such an instance, the user may first select an asset or group of assets that they wish to associate additional data with and further enter such additional data via input fields or menu selections. Subsequently, a user may perform an input to submit the additional data entered and/or selected for an asset. The metadata tool may then facilitate transmitting data indicative of the user inputs to the asset data platform, which may in turn store in the one or more databases the additional information in an entry corresponding to the selected asset(s) identifier.

In some examples, various other tools (e.g., those described above, a data analysis tool, etc.) may utilize the additional information provided through the metadata tool. In one example, a data analysis tool may be able to search for and retrieve asset-related data based at least in part on one or more specified types of additional data (e.g., operator, weather, etc.). In another instance, a task creation tool may utilize the additional data to populate task fields. Various other possibilities also exist.

Accordingly, in one aspect, disclosed herein is an computing system that includes (a) a network interface configured to communicatively couple the computing system to a plurality of assets that are each located remote from the computing system and a plurality of client stations that are each running a software application for visualizing asset data handled by the computing system, (b) at least one processor, (c) a non-transitory computer-readable medium, and (d) program instructions stored on the non-transitory computer-readable medium that are executable by the at least one processor to cause the computing system to perform at least the following operations: (i) receive, from a given client station of the plurality of client stations, visualization parameters comprising an asset identifier for a given asset of the plurality of assets and an event identifier for a given type of asset event related to the operation of the given asset, (ii) based on the visualization parameters, identify one or more instances of the given type of asset event that occurred at the given asset within a given timeframe in the past, (iii) obtain aggregated signal data that is related to the identified one or more instances of the given type of signal event, wherein the aggregated signal data comprises signal data that was generated by at least one signal source of the given asset during the given timeframe in the past and aggregated over a first resolution of time, and (iv) cause the given client station to display a visual representation of the identified one or more instances of the given type of asset event together with the aggregated signal data.

In another aspect, disclosed herein is a non-transitory computer-readable medium having instructions stored thereon that are executable to cause a computing system to (a) receive, from a given client station of a plurality of client stations that are communicatively coupled to the computing system, visualization parameters comprising an asset identifier for a given asset of a plurality of remote assets that are communicatively coupled to the computing system and an event identifier for a given type of asset event related to the operation of the given asset, (b) based on the visualization parameters, identify one or more instances of the given type of asset event that occurred at the given asset within a given timeframe in the past, (c) obtain aggregated signal data that is related to the identified one or more instances of the given type of signal event, wherein the aggregated signal data comprises signal data that was (a) generated by at least one signal source of the given asset during the given timeframe in the past and (b) aggregated over a first resolution of time, and (d) cause the given client station to display a visual representation of the identified one or more instances of the given type of asset event together with the aggregated signal data.

In yet another aspect, disclosed herein is a computer-implemented method performed by a computing system that is communicatively coupled to a plurality of assets that are each located remote from the computing system and a plurality of client stations that are each running a software application for visualizing asset data handled by the computing system, the method comprising: (a) receiving, from a given client station of the plurality of client stations, visualization parameters comprising an asset identifier for a given asset of the plurality of assets and an event identifier for a given type of asset event related to the operation of the given asset, (b) based on the visualization parameters, identifying one or more instances of the given type of asset event that occurred at the given asset within a given timeframe in the past, (c) obtaining aggregated signal data that is related to the identified one or more instances of the given type of signal event, wherein the aggregated signal data comprises signal data that was generated by at least one signal source of the given asset during the given timeframe in the past and aggregated over a first resolution of time, and (d) causing the given client station to display a visual representation of the identified one or more instances of the given type of asset event together with the aggregated signal data.

One of ordinary skill in the art will appreciate these as well as numerous other aspects in reading the following disclosure.

BRIEF DESCRIPTION OF THE DRAWINGS

FIG. 7B is a conceptual diagram of a data structure including stored aggregated data.

FIG. 12 depicts an example task creation GUI.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

Figure 1:
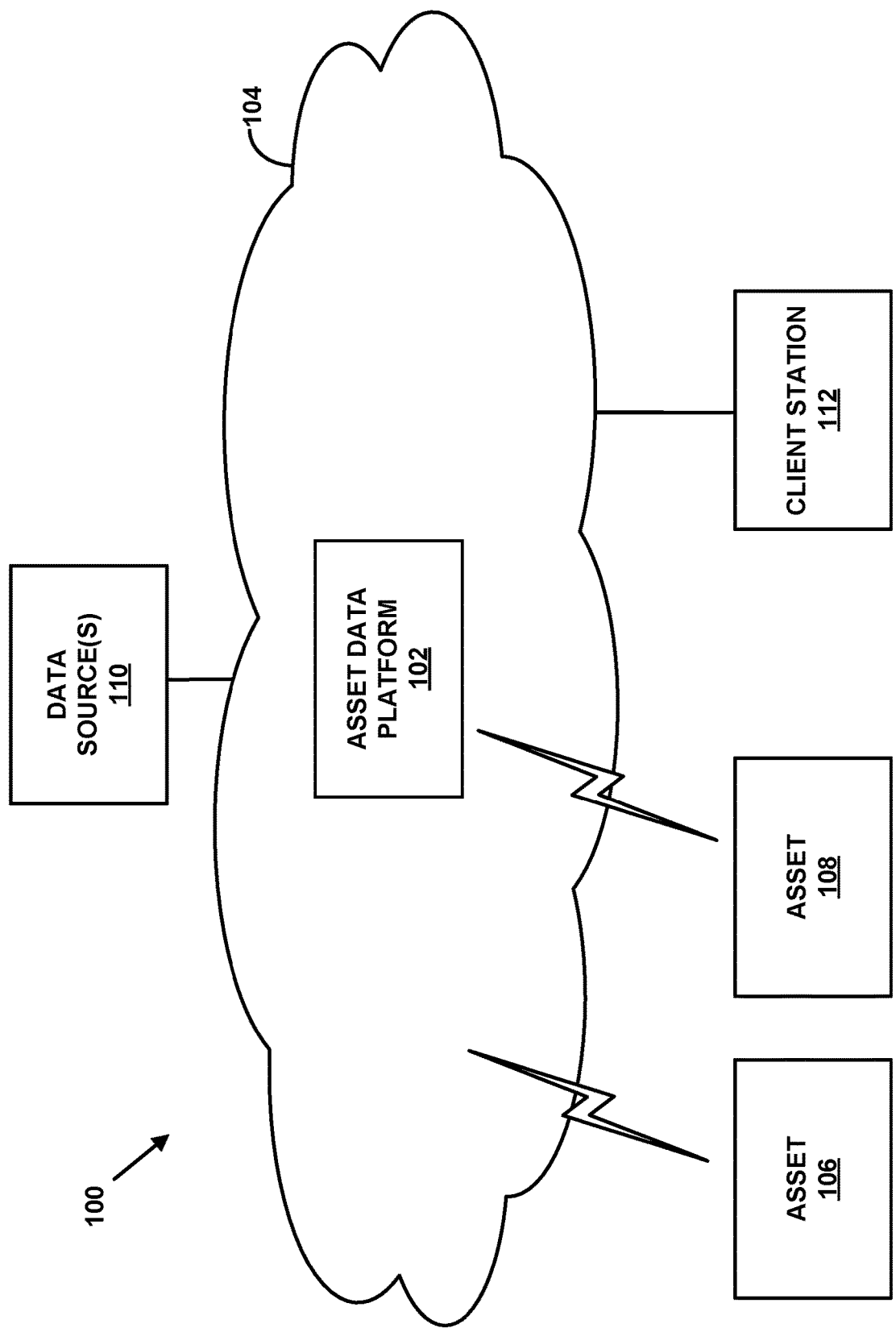
FIG. 1 depicts an example network configuration in which example embodiments may be implemented.

Turning now to the figures, FIG. 1 depicts an example network configuration 100 in which example embodiments may be implemented. As shown, the network configuration 100 includes at its core a remote computing system 102 that may be configured as an asset data platform, which may communicate via a communication network 104 with one or more assets, such as representative assets 106 and 108, one or more data sources, such as representative data source 110, and one or more output systems, such as representative client station 112. It should be understood that the network configuration may include various other systems as well.

Broadly speaking, the asset data platform 102 (sometimes referred to herein as an "asset condition monitoring system") may take the form of one or more computer systems that are configured to receive, ingest, process, analyze, and/or provide access to asset-related data. For instance, a platform may include one or more servers (or the like) having hardware components and software components that are configured to carry out one or more of the functions disclosed herein for receiving, ingesting, processing, analyzing, and/or providing access to asset-related data. Additionally, a platform may include one or more user interface components that enable a platform user to interface with the platform. In practice, these computing systems may be located in a single physical location or distributed amongst a plurality of locations, and may be communicatively linked via a system bus, a communication network (e.g., a private network), or some other connection mechanism. Further, the platform may be arranged to receive and transmit data according to dataflow technology, such as TPL Dataflow or NiFi, among other examples. The platform may take other forms as well. The asset data platform 102 is discussed in further detail below with reference to FIG. 4.

As shown in FIG. 1, the asset data platform 102 may be configured to communicate, via the communication network 104, with the one or more assets, data sources, and/or output systems in the network configuration 100. For example, the asset data platform 102 may receive asset-related data, via the communication network 104, that is sent by one or more assets and/or data sources. As another example, the asset data platform 102 may transmit asset-related data and/or commands, via the communication network 104, for receipt by an output system, such as a client station, a work-order system, a parts-ordering system, etc. The asset data platform 102 may engage in other types of communication via the communication network 104 as well.

In general, the communication network 104 may include one or more computing systems and network infrastructure configured to facilitate transferring data between asset data platform 102 and the one or more assets, data sources, and/or output systems in the network configuration 100. The communication network 104 may be or may include one or more Wide-Area Networks (WANs) and/or Local-Area Networks (LANs), which may be wired and/or wireless and may support secure communication. In some examples, the communication network 104 may include one or more cellular networks and/or the Internet, among other networks. The communication network 104 may operate according to one or more communication protocols, such as LTE, CDMA, GSM, LPWAN, WiFi, Bluetooth, Ethernet, HTTP/S, TCP, CoAP/DTLS and the like. Although the communication network 104 is shown as a single network, it should be understood that the communication network 104 may include multiple, distinct networks that are themselves communicatively linked. Further, in example cases, the communication network 104 may facilitate secure communications between network components (e.g., via encryption or other security measures). The communication network 104 could take other forms as well.

Further, although not shown, the communication path between the asset data platform 102 and the one or more assets, data sources, and/or output systems may include one or more intermediate systems. For example, the one or more assets and/or data sources may send asset-related data to one or more intermediary systems, such as an asset gateway or an organization's existing platform (not shown), and the asset data platform 102 may then be configured to receive the asset-related data from the one or more intermediary systems. As another example, the asset data platform 102 may communicate with an output system via one or more intermediary systems, such as a host server (not shown). Many other configurations are also possible.

In general, the assets 106 and 108 may take the form of any device configured to perform one or more operations (which may be defined based on the field) and may also include equipment configured to transmit data indicative of the operation of the given asset (i.e., operating conditions). This data may take various forms, examples of which may include operating data, such as sensor/actuator data (e.g., signal data) and/or abnormal-condition indicators (e.g., fault codes), identifying data for the asset, location data for the asset, etc.

Representative examples of asset types may include transportation machines (e.g., locomotives, aircrafts, passenger vehicles, semi-trailer trucks, ships, etc.), industrial machines (e.g., mining equipment, construction equipment, processing equipment, assembly equipment, etc.), medical machines (e.g., medical imaging equipment, surgical equipment, medical monitoring systems, medical laboratory equipment, etc.), utility machines (e.g., turbines, solar farms, etc.), and unmanned aerial vehicles, among other examples. Additionally, the assets of each given type may have various different configurations (e.g., brand, make, model, firmware version, etc.).

As such, in some examples, the assets 106 and 108 may each be of the same type (e.g., a fleet of locomotives or aircrafts, a group of wind turbines, a pool of milling machines, or a set of magnetic resonance imagining (MM) machines, among other examples) and perhaps may have the same configuration (e.g., the same brand, make, model, firmware version, etc.). In other examples, the assets 106 and 108 may have different asset types or different configurations (e.g., different brands, makes, models, and/or firmware versions). For instance, assets 106 and 108 may be different pieces of equipment at a job site (e.g., an excavation site) or a production facility, among numerous other examples. Those of ordinary skill in the art will appreciate that these are but a few examples of assets and that numerous others are possible and contemplated herein.

Depending on an asset's type and/or configuration, the asset may also include one or more subsystems configured to perform one or more respective operations. For example, in the context of transportation assets, subsystems may include engines, transmissions, drivetrains, fuel systems, battery systems, exhaust systems, braking systems, electrical systems, signal processing systems, generators, gear boxes, rotors, and hydraulic systems, among numerous other examples. In practice, an asset's multiple subsystems may operate in parallel or sequentially in order for an asset to operate. Representative assets are discussed in further detail below with reference to FIG. 2.

In general, the data source 110 may be or include one or more computing systems configured to collect, store, and/or provide data that is related to the assets or is otherwise relevant to the functions performed by the asset data platform 102. For example, the data source 110 may collect and provide operating data that originates from the assets (e.g., historical operating data), in which case the data source 110 may serve as an alternative source for such asset operating data. As another example, the data source 110 may be configured to provide data that does not originate from the assets, which may be referred to herein as "external data." Such a data source may take various forms.

In one implementation, the data source 110 could take the form of an environment data source that is configured to provide data indicating some characteristic of the environment in which assets are operated. Examples of environment data sources include weather-data servers, global navigation satellite systems (GNSS) servers, map-data servers, and topography-data servers that provide information regarding natural and artificial features of a given area, among other examples.

In another implementation, the data source 110 could take the form of asset-management data source that provides data indicating events or statuses of entities (e.g., other assets) that may affect the operation or maintenance of assets (e.g., when and where an asset may operate or receive maintenance). Examples of asset-management data sources include asset-maintenance servers that provide information regarding inspections, maintenance, services, and/or repairs that have been performed and/or are scheduled to be performed on assets, traffic-data servers that provide information regarding air, water, and/or ground traffic, asset-schedule servers that provide information regarding expected routes and/or locations of assets on particular dates and/or at particular times, defect detector systems (also known as "hotbox" detectors) that provide information regarding one or more operating conditions of an asset that passes in proximity to the defect detector system, and part-supplier servers that provide information regarding parts that particular suppliers have in stock and prices thereof, among other examples.

The data source 110 may also take other forms, examples of which may include fluid analysis servers that provide information regarding the results of fluid analyses and power-grid servers that provide information regarding electricity consumption, among other examples. One of ordinary skill in the art will appreciate that these are but a few examples of data sources and that numerous others are possible.

In practice, the asset data platform 102 may receive data from the data source 110 by "subscribing" to a service provided by the data source. However, the asset data platform 102 may receive data from the data source 110 in other manners as well.

The client station 112 may take the form of a computing system or device configured to access and enable a user to interact with the asset data platform 102. To facilitate this, the client station may include hardware components such as a user interface, a network interface, a processor, and data storage, among other components. Additionally, the client station may be configured with software components that enable interaction with the asset data platform 102, such as a web browser that is capable of accessing a web application provided by the asset data platform 102 or a native client application associated with the asset data platform 102, among other examples. Representative examples of client stations may include a desktop computer, a laptop, a netbook, a tablet, a smartphone, a personal digital assistant (PDA), or any other such device now known or later developed.

Other examples of output systems may take include a work-order system configured to output a request for a mechanic or the like to repair an asset or a parts-ordering system configured to place an order for a part of an asset and output a receipt thereof, among others.

It should be understood that the network configuration 100 is one example of a network in which embodiments described herein may be implemented. Numerous other arrangements are possible and contemplated herein. For instance, other network configurations may include additional components not pictured and/or more or less of the pictured components.

II. EXAMPLE ASSET

Figure 2:
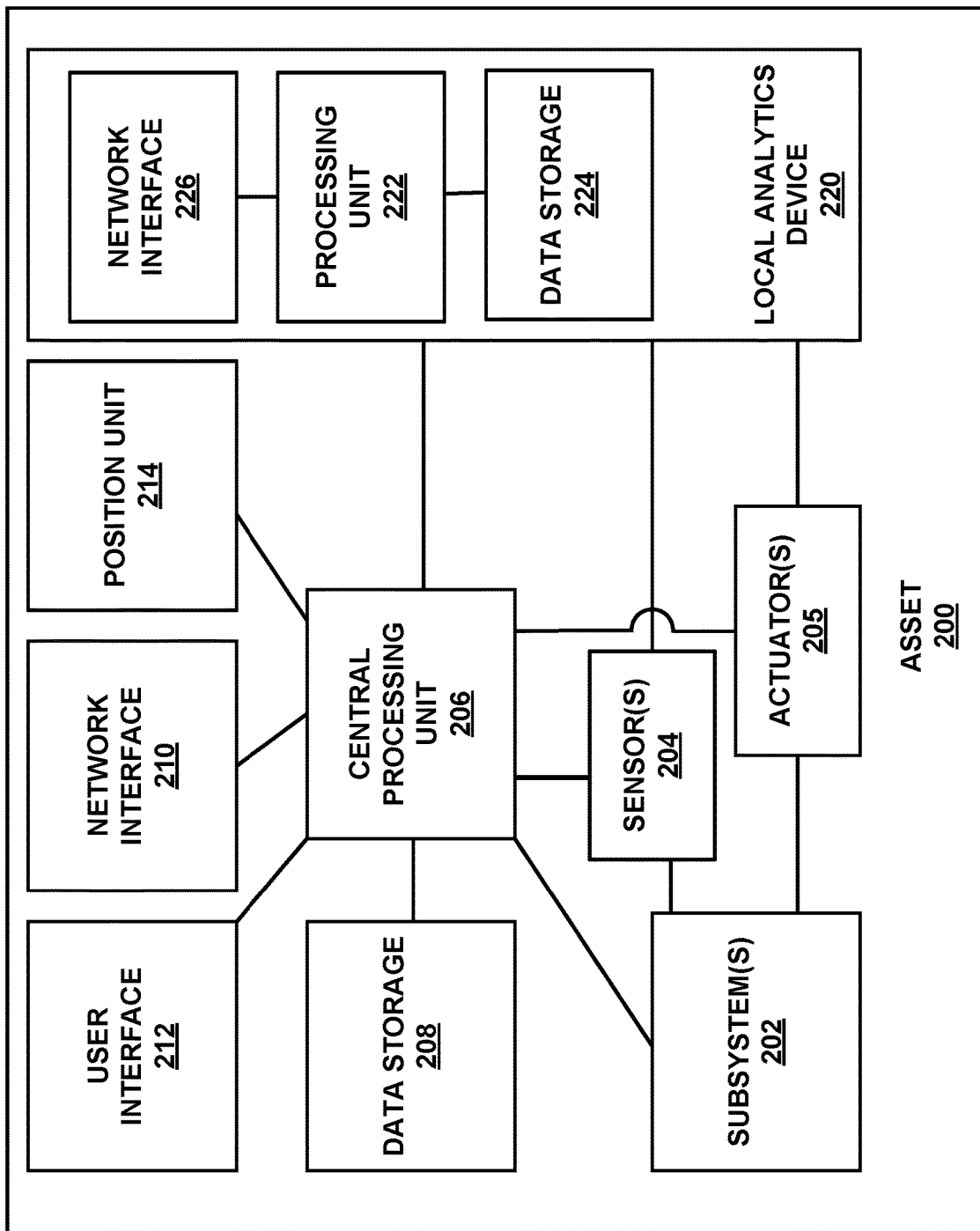
FIG. 2 depicts a simplified block diagram of an example asset.

Turning to FIG. 2, a simplified block diagram of an example asset 200 is depicted. Either or both of assets 106 and 108 from FIG. 1 may be configured like the asset 200. As shown, the asset 200 may include one or more subsystems 202, one or more sensors 204, one or more actuators 205, a central processing unit 206, data storage 208, a network interface 210, a user interface 212, a position unit 214, and perhaps also a local analytics device 220, all of which may be communicatively linked (either directly or indirectly) by a system bus, network, or other connection mechanism. One of ordinary skill in the art will appreciate that the asset 200 may include additional components not shown and/or more or less of the depicted components.

Broadly speaking, the asset 200 may include one or more electrical, mechanical, and/or electromechanical components configured to perform one or more operations. In some cases, one or more components may be grouped into a given subsystem 202.

Generally, a subsystem 202 may include a group of related components that are part of the asset 200. A single subsystem 202 may independently perform one or more operations or the single subsystem 202 may operate along with one or more other subsystems to perform one or more operations. Typically, different types of assets, and even different classes of the same type of assets, may include different subsystems. Representative examples of subsystems are discussed above with reference to FIG. 1.

As suggested above, the asset 200 may be outfitted with various sensors 204 that are configured to monitor operating conditions of the asset 200 and various actuators 205 that are configured to interact with the asset 200 or a component thereof and monitor operating conditions of the asset 200. In some cases, some of the sensors 204 and/or actuators 205 may be grouped based on a particular subsystem 202. In this way, the group of sensors 204 and/or actuators 205 may be configured to monitor operating conditions of the particular subsystem 202, and the actuators from that group may be configured to interact with the particular subsystem 202 in some way that may alter the subsystem's behavior based on those operating conditions.

In general, a sensor 204 may be configured to detect a physical property, which may be indicative of one or more operating conditions of the asset 200, and provide an indication, such as an electrical signal, of the detected physical property. In operation, the sensors 204 may be configured to obtain measurements continuously, periodically (e.g., based on a sampling frequency), and/or in response to some triggering event. In some examples, the sensors 204 may be preconfigured with operating parameters for performing measurements and/or may perform measurements in accordance with operating parameters provided by the central processing unit 206 (e.g., sampling signals that instruct the sensors 204 to obtain measurements). In examples, different sensors 204 may have different operating parameters (e.g., some sensors may sample based on a first frequency, while other sensors sample based on a second, different frequency). In any event, the sensors 204 may be configured to transmit electrical signals indicative of a measured physical property to the central processing unit 206. The sensors 204 may continuously or periodically provide such signals to the central processing unit 206.

For instance, sensors 204 may be configured to measure physical properties such as the location and/or movement of the asset 200, in which case the sensors may take the form of GNSS sensors, dead-reckoning-based sensors, accelerometers, gyroscopes, pedometers, magnetometers, or the like. In example embodiments, one or more such sensors may be integrated with or located separate from the position unit 214, discussed below.

Additionally, various sensors 204 may be configured to measure other operating conditions of the asset 200, examples of which may include temperatures, pressures, speeds, acceleration or deceleration rates, friction, power usages, fuel usages, fluid levels, runtimes, voltages and currents, magnetic fields, electric fields, presence or absence of objects, positions of components, and power generation, among other examples. One of ordinary skill in the art will appreciate that these are but a few example operating conditions that sensors may be configured to measure. Additional or fewer sensors may be used depending on the industrial application or specific asset.

As suggested above, an actuator 205 may be configured similar in some respects to a sensor 204. Specifically, an actuator 205 may be configured to detect a physical property indicative of an operating condition of the asset 200 and provide an indication thereof in a manner similar to the sensor 204.

Moreover, an actuator 205 may be configured to interact with the asset 200, one or more subsystems 202, and/or some component thereof. As such, an actuator 205 may include a motor or the like that is configured to perform a mechanical operation (e.g., move) or otherwise control a component, subsystem, or system. In a particular example, an actuator may be configured to measure a fuel flow and alter the fuel flow (e.g., restrict the fuel flow), or an actuator may be configured to measure a hydraulic pressure and alter the hydraulic pressure (e.g., increase or decrease the hydraulic pressure). Numerous other example interactions of an actuator are also possible and contemplated herein.

Generally, the central processing unit 206 may include one or more processors and/or controllers, which may take the form of a general- or special-purpose processor or controller. In particular, in example implementations, the central processing unit 206 may be or include microprocessors, microcontrollers, application specific integrated circuits, digital signal processors, and the like. In turn, the data storage 208 may be or include one or more non-transitory computer-readable storage media, such as optical, magnetic, organic, or flash memory, among other examples.

The central processing unit 206 may be configured to store, access, and execute computer-readable program instructions stored in the data storage 208 to perform the operations of an asset described herein. For instance, as suggested above, the central processing unit 206 may be configured to receive respective sensor signals from the sensors 204 and/or actuators 205. The central processing unit 206 may be configured to store sensor and/or actuator data in and later access it from the data storage 208.

The central processing unit 206 may also be configured to determine whether received sensor and/or actuator signals trigger any abnormal-condition indicators, such as fault codes. For instance, the central processing unit 206 may be configured to store in the data storage 208 abnormal-condition rules, each of which include a given abnormal-condition indicator representing a particular abnormal condition and respective triggering criteria that trigger the abnormal-condition indicator. That is, each abnormal-condition indicator corresponds with one or more sensor and/or actuator measurement values that must be satisfied before the abnormal-condition indicator is triggered. In practice, the asset 200 may be pre-programmed with the abnormal-condition rules and/or may receive new abnormal-condition rules or updates to existing rules from a computing system, such as the asset data platform 102.

In any event, the central processing unit 206 may be configured to determine whether received sensor and/or actuator signals trigger any abnormal-condition indicators. That is, the central processing unit 206 may determine whether received sensor and/or actuator signals satisfy any triggering criteria. When such a determination is affirmative, the central processing unit 206 may generate abnormal-condition data and then may also cause the asset's network interface 210 to transmit the abnormal-condition data to the asset data platform 102 and/or cause the asset's user interface 212 to output an indication of the abnormal condition, such as a visual and/or audible alert. Additionally, the central processing unit 206 may log the occurrence of the abnormal-condition indicator being triggered in the data storage 208, perhaps with a timestamp.

Figure 3:
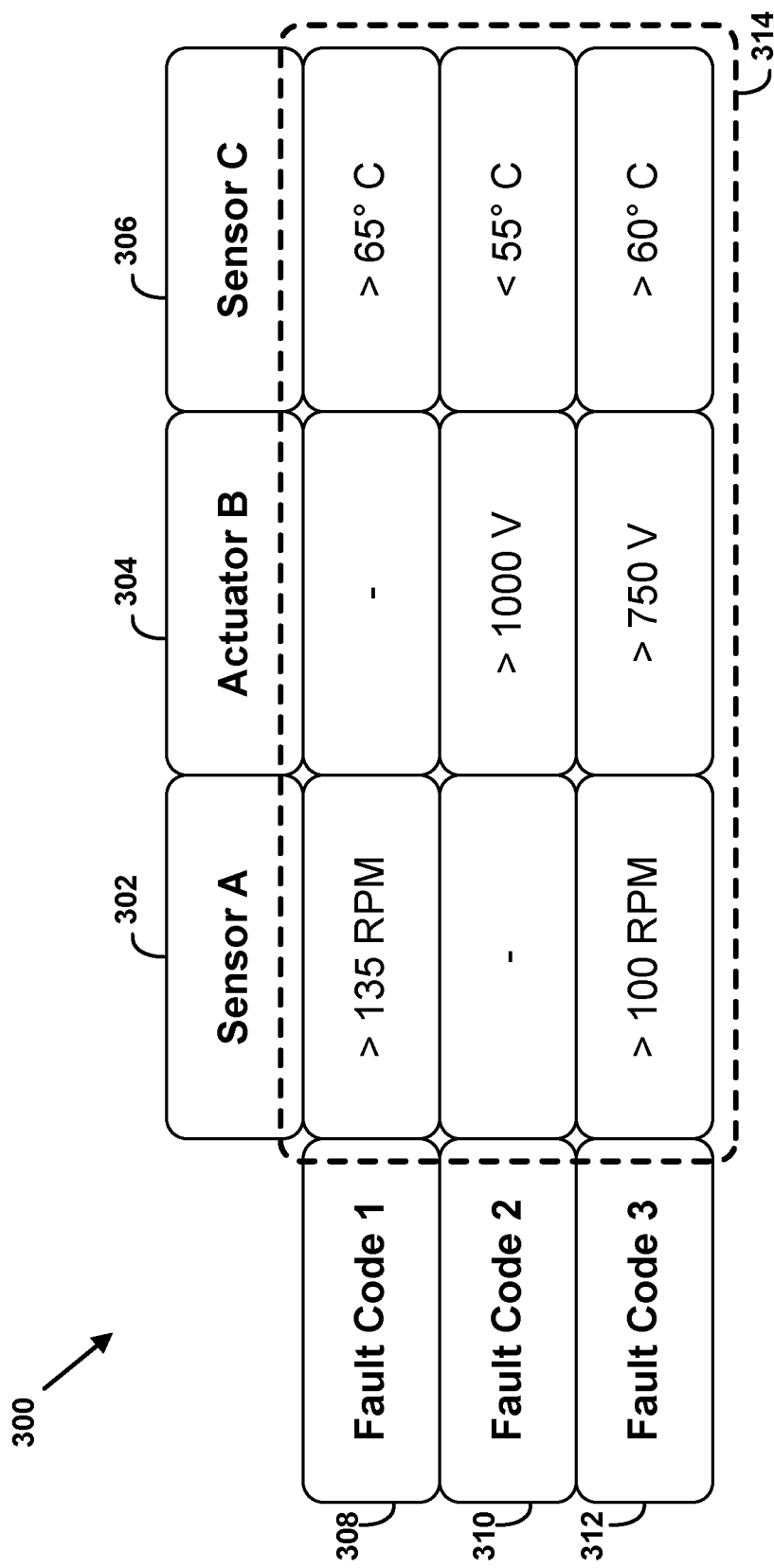
FIG. 3 depicts a conceptual illustration of example abnormal-condition indicators and sensor criteria.

FIG. 3 depicts a conceptual illustration of example abnormal-condition indicators and respective triggering criteria for an asset. In particular, FIG. 3 depicts a conceptual illustration of example fault codes. As shown, table 300 includes columns 302, 304, and 306 that correspond to Sensor A, Actuator B, and Sensor C, respectively, and rows 308, 310, and 312 that correspond to Fault Codes 1, 2, and 3, respectively. Entries 314 then specify sensor criteria (e.g., sensor value thresholds) that correspond to the given fault codes.

For example, Fault Code 1 will be triggered when Sensor A detects a rotational measurement greater than 135 revolutions per minute (RPM) and Sensor C detects a temperature measurement greater than 65° Celsius (C), Fault Code 2 will be triggered when Actuator B detects a voltage measurement greater than 1000 Volts (V) and Sensor C detects a temperature measurement less than 55° C., and Fault Code 3 will be triggered when Sensor A detects a rotational measurement greater than 100 RPM, Actuator B detects a voltage measurement greater than 750 V, and Sensor C detects a temperature measurement greater than 60° C. One of ordinary skill in the art will appreciate that FIG. 3 is provided for purposes of example and explanation only and that numerous other fault codes and/or triggering criteria are possible and contemplated herein.

Referring back to FIG. 2, the central processing unit 206 may be configured to carry out various additional functions for managing and/or controlling operations of the asset 200 as well. For example, the central processing unit 206 may be configured to provide instruction signals to the subsystems 202 and/or the actuators 205 that cause the subsystems 202 and/or the actuators 205 to perform some operation, such as modifying a throttle position. Additionally, the central processing unit 206 may be configured to modify the rate at which it processes data from the sensors 204 and/or the actuators 205, or the central processing unit 206 may be configured to provide instruction signals to the sensors 204 and/or actuators 205 that cause the sensors 204 and/or actuators 205 to, for example, modify a sampling rate. Moreover, the central processing unit 206 may be configured to receive signals from the subsystems 202, the sensors 204, the actuators 205, the network interfaces 210, the user interfaces 212, and/or the position unit 214 and based on such signals, cause an operation to occur. Further still, the central processing unit 206 may be configured to receive signals from a computing device, such as a diagnostic device, that cause the central processing unit 206 to execute one or more diagnostic tools in accordance with diagnostic rules stored in the data storage 208. Other functionalities of the central processing unit 206 are discussed below.

The network interface 210 may be configured to provide for communication between the asset 200 and various network components connected to the communication network 104. For example, the network interface 210 may be configured to facilitate wireless communications to and from the communication network 104 and may thus take the form of an antenna structure and associated equipment for transmitting and receiving various over-the-air signals. Other examples are possible as well. In practice, the network interface 210 may be configured according to a communication protocol, such as but not limited to any of those described above.

The user interface 212 may be configured to facilitate user interaction with the asset 200 and may also be configured to facilitate causing the asset 200 to perform an operation in response to user interaction. Examples of user interfaces 212 include touch-sensitive interfaces, mechanical interfaces (e.g., levers, buttons, wheels, dials, keyboards, etc.), and other input interfaces (e.g., microphones), among other examples. In some cases, the user interface 212 may include or provide connectivity to output components, such as display screens, speakers, headphone jacks, and the like.

The position unit 214 may be generally configured to facilitate performing functions related to geo-spatial location/position and/or navigation. More specifically, the position unit 214 may be configured to facilitate determining the location/position of the asset 200 and/or tracking the asset 200's movements via one or more positioning technologies, such as a GNSS technology (e.g., GPS, GLONASS, Galileo, BeiDou, or the like), triangulation technology, and the like. As such, the position unit 214 may include one or more sensors and/or receivers that are configured according to one or more particular positioning technologies.

In example embodiments, the position unit 214 may allow the asset 200 to provide to other systems and/or devices (e.g., the asset data platform 102) position data that indicates the position of the asset 200, which may take the form of GPS coordinates, among other forms. In some implementations, the asset 200 may provide to other systems position data continuously, periodically, based on triggers, or in some other manner. Moreover, the asset 200 may provide position data independent of or along with other asset-related data (e.g., along with operating data).

The local analytics device 220 may generally be configured to receive and analyze data related to the asset 200 and based on such analysis, may cause one or more operations to occur at the asset 200. For instance, the local analytics device 220 may receive operating data for the asset 200 (e.g., signal data generated by the sensors 204 and/or actuators 205) and based on such data, may provide instructions to the central processing unit 206, the sensors 204, and/or the actuators 205 that cause the asset 200 to perform an operation. In another example, the local analytics device 220 may receive location data from the position unit 214 and based on such data, may modify how it handles predictive models and/or workflows for the asset 200. Other example analyses and corresponding operations are also possible.

To facilitate some of these operations, the local analytics device 220 may include one or more asset interfaces that are configured to couple the local analytics device 220 to one or more of the asset's on-board systems. For instance, as shown in FIG. 2, the local analytics device 220 may have an interface to the asset's central processing unit 206, which may enable the local analytics device 220 to receive data from the central processing unit 206 (e.g., operating data that is generated by sensors 204 and/or actuators 205 and sent to the central processing unit 206, or position data generated by the position unit 214) and then provide instructions to the central processing unit 206. In this way, the local analytics device 220 may indirectly interface with and receive data from other on-board systems of the asset 200 (e.g., the sensors 204 and/or actuators 205) via the central processing unit 206. Additionally or alternatively, as shown in FIG. 2, the local analytics device 220 could have an interface to one or more sensors 204 and/or actuators 205, which may enable the local analytics device 220 to communicate directly with the sensors 204 and/or actuators 205. The local analytics device 220 may interface with the on-board systems of the asset 200 in other manners as well, including the possibility that the interfaces illustrated in FIG. 2 are facilitated by one or more intermediary systems that are not shown.

In practice, the local analytics device 220 may enable the asset 200 to locally perform advanced analytics and associated operations, such as executing a predictive model and corresponding workflow, that may otherwise not be able to be performed with the other on-asset components. As such, the local analytics device 220 may help provide additional processing power and/or intelligence to the asset 200.

It should be understood that the local analytics device 220 may also be configured to cause the asset 200 to perform operations that are not related to a predictive model. For example, the local analytics device 220 may receive data from a remote source, such as the asset data platform 102 or the output system 112, and based on the received data cause the asset 200 to perform one or more operations. One particular example may involve the local analytics device 220 receiving a firmware update for the asset 200 from a remote source and then causing the asset 200 to update its firmware. Another particular example may involve the local analytics device 220 receiving a diagnosis instruction from a remote source and then causing the asset 200 to execute a local diagnostic tool in accordance with the received instruction. Numerous other examples are also possible.

As shown, in addition to the one or more asset interfaces discussed above, the local analytics device 220 may also include a processing unit 222, a data storage 224, and a network interface 226, all of which may be communicatively linked by a system bus, network, or other connection mechanism. The processing unit 222 may include any of the components discussed above with respect to the central processing unit 206. In turn, the data storage 224 may be or include one or more non-transitory computer-readable storage media, which may take any of the forms of computer-readable storage media discussed above.

The processing unit 222 may be configured to store, access, and execute computer-readable program instructions stored in the data storage 224 to perform the operations of a local analytics device described herein. For instance, the processing unit 222 may be configured to receive respective sensor and/or actuator signals generated by the sensors 204 and/or actuators 205 and may execute a predictive model and corresponding workflow based on such signals. Other functions are described below.

The network interface 226 may be the same or similar to the network interfaces described above. In practice, the network interface 226 may facilitate communication between the local analytics device 220 and the asset data platform 102.

In some example implementations, the local analytics device 220 may include and/or communicate with a user interface that may be similar to the user interface 212. In practice, the user interface may be located remote from the local analytics device 220 (and the asset 200). Other examples are also possible.

While FIG. 2 shows the local analytics device 220 physically and communicatively coupled to its associated asset (e.g., the asset 200) via one or more asset interfaces, it should also be understood that this might not always be the case. For example, in some implementations, the local analytics device 220 may not be physically coupled to its associated asset and instead may be located remote from the asset 200. In an example of such an implementation, the local analytics device 220 may be wirelessly, communicatively coupled to the asset 200. Other arrangements and configurations are also possible.

For more detail regarding the configuration and operation of a local analytics device, please refer to U.S. application Ser. No. 14/963,207, which is incorporated by reference herein in its entirety.

One of ordinary skill in the art will appreciate that the asset 200 shown in FIG. 2 is but one example of a simplified representation of an asset and that numerous others are also possible. For instance, other assets may include additional components not pictured and/or more or less of the pictured components. Moreover, a given asset may include multiple, individual assets that are operated in concert to perform operations of the given asset. Other examples are also possible.

III. EXAMPLE PLATFORM

Figure 4:
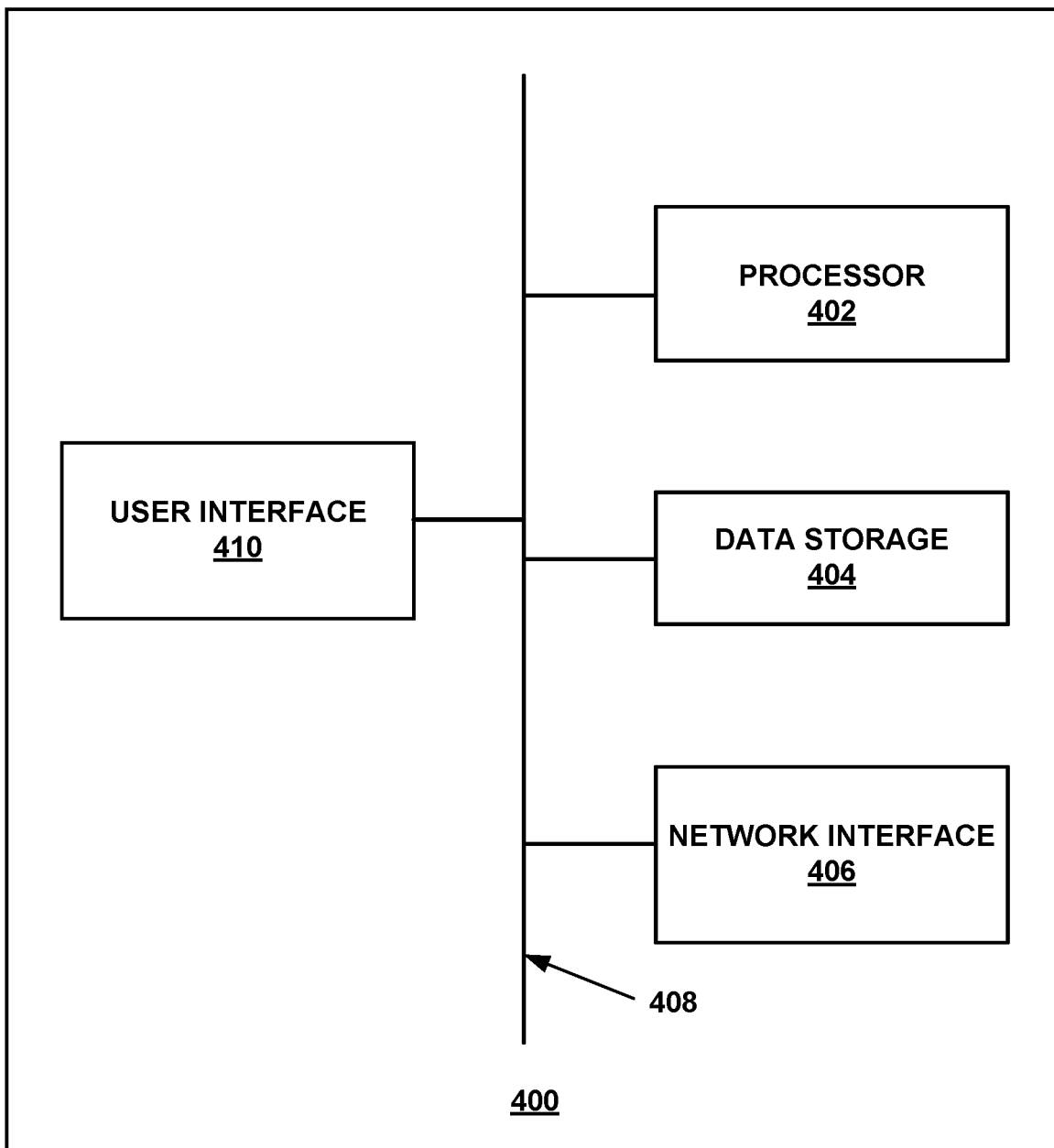
FIG. 4 depicts a structural diagram of an example platform.

FIG. 4 is a simplified block diagram illustrating some components that may be included in an example data asset platform 400 from a structural perspective. In line with the discussion above, the data asset platform 400 may generally comprise one or more computer systems (e.g., one or more servers), and these one or more computer systems may collectively include at least a processor 402, data storage 404, network interface 406, and perhaps also a user interface 410, all of which may be communicatively linked by a communication link 408 such as a system bus, network, or other connection mechanism.

The processor 402 may include one or more processors and/or controllers, which may take the form of a general- or special-purpose processor or controller. In particular, in example implementations, the processing unit 402 may include microprocessors, microcontrollers, application-specific integrated circuits, digital signal processors, and the like.

In turn, data storage 404 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, an optical-storage device, etc.

As shown in FIG. 4, the data storage 404 may be provisioned with software components that enable the platform 400 to carry out the functions disclosed herein. These software components may generally take the form of program instructions that are executable by the processor 402, and may be arranged together into applications, software development kits, toolsets, or the like. In addition, the data storage 404 may also be provisioned with one or more databases that are arranged to store data related to the functions carried out by the platform, examples of which include time-series databases, document databases, relational databases (e.g., MySQL), key-value databases, and graph databases, among others. The one or more databases may also provide for poly-glot storage.

The network interface 406 may be configured to facilitate wireless and/or wired communication between the platform 400 and various network components via the communication network 104, such as assets 106 and 108, data source 110, and client station 112. As such, network interface 406 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. Network interface 406 may also include multiple network interfaces that support various different types of network connections, some examples of which may include Hadoop, FTP, relational databases, high frequency data such as OSI PI, batch data such as XML, and Base64. Other configurations are possible as well.

The example data asset platform 400 may also support a user interface 410 that is configured to facilitate user interaction with the platform 400 and may also be configured to facilitate causing the platform 400 to perform an operation in response to user interaction. This user interface 410 may include or provide connectivity to various input components, examples of which include touch-sensitive interfaces, mechanical interfaces (e.g., levers, buttons, wheels, dials, keyboards, etc.), and other input interfaces (e.g., microphones). Additionally, the user interface 410 may include or provide connectivity to various output components, examples of which may include display screens, speakers, headphone jacks, and the like. Other configurations are possible as well, including the possibility that the user interface 410 is embodied within a client station that is communicatively coupled to the example platform.

Figure 5:
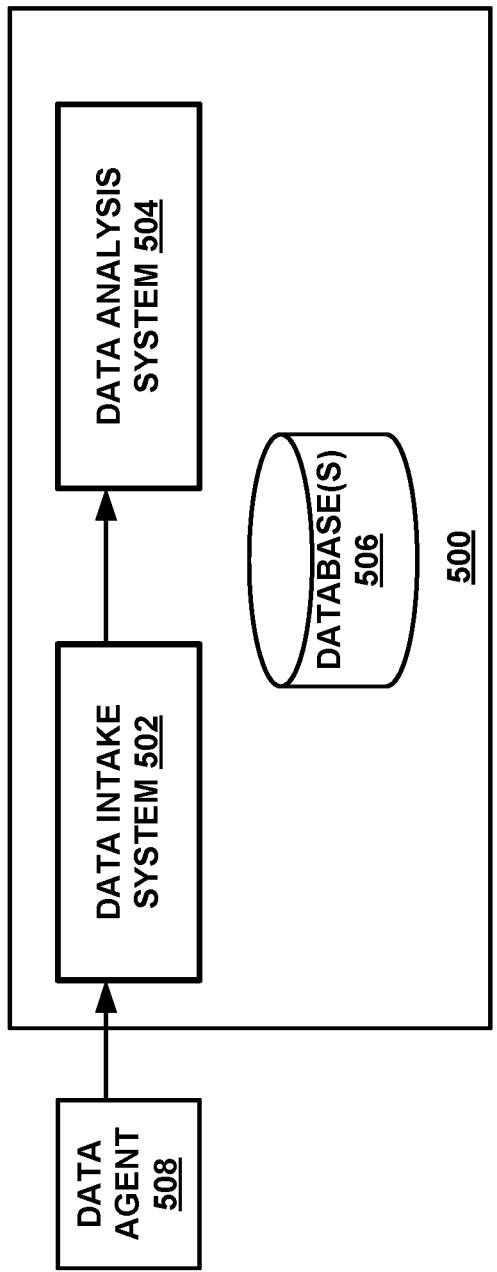
FIG. 5 is a functional block diagram of an example platform.

Referring now to FIG. 5, another simplified block diagram is provided to illustrate some components that may be included in an example platform 500 from a functional perspective. For instance, as shown, the example platform 500 may include a data intake system 502 and a data analysis system 504, each of which comprises a combination of hardware and software that is configured to carry out particular functions. The platform 500 may also include a database 506 coupled to one or more of the data intake system 502 and the data analysis system 504. In practice, these functional systems may be implemented on a single computer system or distributed across a plurality of computer systems.

The data intake system 502 may generally function to receive asset-related data and then provide at least a portion of the received data to the data analysis system 504. As such, the data intake system 502 may be configured to receive asset-related data from various sources, examples of which may include an asset, an asset-related data source, or an organization's existing infrastructure. The data received by the data intake system 502 may take various forms, examples of which may include analog signals, data streams, and/or network packets. Further, in some examples, the data intake system 502 may be configured according to a given dataflow technology, such as a NiFi receiver or the like.

In some embodiments, before the data intake system 502 receives data from a given source (e.g., an asset, an asset-related data source, an organization's existing infrastructure, etc.), that source may be provisioned with a data agent 508. In general, the data agent 508 may be a software component that functions to access the relevant data at the given data source, place the data in the appropriate format, and then facilitate the transmission of that data to to the platform 500 for receipt by the data intake system 502. As such, the data agent 508 may cause the given source to perform operations such as compression and/or decompression, encryption and/or de-encryption, analog-to-digital and/or digital-to-analog conversion, filtration, amplification, and/or data mapping, among other examples. In other embodiments, however, the given data source may be capable of accessing, formatting, and/or transmitting data to the example platform 500 without the assistance of a data agent.

The data received by the data intake system 502 may take various forms. As one example, the received data may include operating data for an asset such as, for example, signal data (e.g., sensor and/or actuator data), abnormal-condition indicators, asset event indicators, and asset location data. As another, the received data may include external data related to asset operation such as, for example, asset inspection/maintenance/repair information, hotbox data, weather data, etc. As yet another example, the received data may also include metadata, signal signatures, or the like that provide additional information about the received data, such as an identifier of the data source and/or a timestamp associated with the received data (e.g., a date and/or time at which the information was obtained). For instance, a unique identifier (e.g., a computer generated alphabetic, numeric, alphanumeric, or the like identifier) may be assigned to each asset, and perhaps to each sensor and actuator, and may be operable to identify the asset, sensor, or actuator from which data originates. The data received by the data intake system 502 may take other forms as well.

The data intake system 502 may also be configured to perform various pre-processing functions on the received data before it provides that data to the data analysis system, to ensure that the received data is clean, up to date, and consistent across records or data structures stored in the platform 500 that manage the data. For example, the data intake system 502 may map the received data into defined data structures and potentially drop any data that cannot be mapped to these data structures. As another example, the data intake system 502 may assess the reliability (or "health") of the received data and potentially drop any unreliable data. As yet another example, the data intake system 502 may "de-dup" the received data by identifying any data has already been received by the platform and then ignoring or dropping such data. As still another example, the data intake system 502 may determine that the received data is related to data already stored in the platform's database 506 (e.g., a different version of the same data) and then merge the received data and stored data together into one data structure or record. As a further example, the data intake system 502 may organize the received data into particular data categories (e.g., by placing the different data categories into different queues). Other functions may also be performed.

In some embodiments, it is also possible that the data agent 508 may perform or assist with certain of these pre-processing functions. As one possible example, the data mapping function could be performed in whole or in part by the data agent 508 rather than the data intake system 502. Other examples are possible as well.

The data intake system 502 may further be configured to store the received data in the database 506 for later retrieval. In line with the discussion above, the database 506 may take various forms, examples of include a time-series database, document database, a relational database (e.g., MySQL), a key-value database, and a graph database, among others. Further, the database 506 may provide for poly-glot storage. For example, the database 506 may store the payload of received data in a first type of database (e.g., a time-series or document database) and store the associated metadata of received data in a second type of database that permits more rapid searching (e.g., a relational database). Other examples are possible as well.

As shown, the data intake system 502 may then be communicatively coupled to the data analysis system 504. This interface between the data intake system 502 and the data analysis system 504 may take various forms. For instance, the data intake system 502 may be communicatively coupled to the data analysis system 504 via an API. Other interface technologies are possible as well.

In one implementation, the data intake system 502 may provide, to the data analysis system 504, data that falls into three general categories: (1) signal data, (2) event data, and (3) asset status data. The signal data may generally take the form of raw or aggregated data representing the measurements taken by the sensors and/or actuators at the assets. The event data may generally take the form of data identifying events that relate to asset operation, such as asset events that correspond to indicators received from an asset (e.g., abnormal-condition indicators, asset event indicators, etc.), inspection events, maintenance events, repair events, fluid events, weather events, or the like. And asset status information may then include status information for the asset, such as an asset identifier, asset location data, etc. The data provided to the data analysis system 504 may also include other data and take other forms as well.

The data analysis system 504 may generally function to receive data from the data intake system 502, analyze that data, and then take various actions based on that data. For example, the data analysis system 504 may identify certain data that is to be output to a client station (e.g., based on a request received from the client station) and may then provide this data to the client station. As another example, the data analysis system 504 may determine that certain data satisfies a predefined rule and may then take certain actions in response to this determination, such as generating new event data or providing a notification to a user via the client station. As another example, the data analysis system 504 may use the received data to train and/or execute a predictive model related to asset operation, and the data analysis system 504 may then take certain actions based on the predictive model's output. As still another example, the data analysis system 504 may make certain data available for external access via an API.

In order to facilitate one or more of these functions, the data analysis system 504 may be configured to provide a web application (or the like) that can be accessed and displayed by a client station. This web application may take various forms, but in general, the web application may comprise one or more web pages that can be displayed by the client station in order to present information to a user and also obtain user input. As another example, the data analysis system 504 may be configured to "host" or "drive" (i.e., provide data to) a native client application associated with the asset data platform that is installed and runs on a client station.

In addition to analyzing the received data for taking potential actions based on such data, the data analysis system 504 may also be configured to store the received data into database 506. The database 506 may persistently store the data for subsequent access by the platform or by other platforms. Additional data-storage related operations are discussed in further detail below.

In some embodiments, the data analysis system 504 may also support a software development kit (SDK) for building, customizing, and adding additional functionality to the platform. Such an SDK may enable customization of the platform's functionality on top of the platform's hardcoded functionality.

The data analysis system 504 may perform various other functions as well. Some functions performed by the data analysis system 504 are discussed in further detail below.

One of ordinary skill in the art will appreciate that the example platform shown in FIGS. 4-5 is but one example of a simplified representation of the components that may be included in a platform and that numerous others are also possible. For instance, other platforms may include additional components not pictured and/or more or less of the pictured components. Moreover, a given platform may include multiple, individual platforms that are operated in concert to perform operations of the given platform. Other examples are also possible.

IV. EXAMPLE OPERATIONS

The operations of the example network configuration 100 depicted in FIG. 1 will now be discussed in further detail below. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

The following description may reference examples where a single data source, such as the asset 106, provides data to the asset data platform 102 that then performs one or more functions. It should be understood that this is done merely for sake of clarity and explanation and is not meant to be limiting. In practice, the asset data platform 102 generally receives data from multiple sources, perhaps simultaneously, and performs operations based on such aggregate received data.

A. Collection of Operating Data

As mentioned above, each of the representative assets 102 and 104 may take various forms and may be configured to perform a number of operations. In a non-limiting example, the asset 106 may take the form of a locomotive that is operable to transfer cargo across the United States. While in transit, the sensors and/or actuators of the asset 106 may obtain data that reflects one or more operating conditions of the asset 106. The sensors and/or actuators may transmit the data to a processing unit of the asset 106.

The processing unit may be configured to receive the data from the sensors and/or actuators. In practice, the processing unit may receive signal data from multiple sensors and/or multiple actuators simultaneously or sequentially. As discussed above, while receiving this data, the processing unit may also be configured to determine whether the data satisfies triggering criteria that trigger any abnormal-condition indicators, such as fault codes. In the event the processing unit determines that one or more abnormal-condition indicators are triggered, the processing unit may be configured to perform one or more local operations, such as outputting an indication of the triggered indicator via a user interface.

The asset 106 may then transmit operating data to the asset data platform 102 via a network interface of the asset 106 and the communication network 104. In operation, the asset 106 may transmit operating data to the asset data platform 102 continuously, periodically, and/or in response to triggering events (e.g., abnormal conditions). Specifically, the asset 106 may transmit operating data periodically based on a particular frequency (e.g., daily, hourly, every fifteen minutes, once per minute, once per second, etc.), or the asset 106 may be configured to transmit a continuous, real-time feed of operating data. Additionally or alternatively, the asset 106 may be configured to transmit operating data based on certain triggers, such as when sensor and/or actuator measurements satisfy triggering criteria for any abnormal-condition indicators. The asset 106 may transmit operating data in other manners as well.

In practice, operating data for the asset 106 may include sensor data, actuator data, abnormal-condition data, and/or other asset event data (e.g., data indicating asset shutdowns, restarts, diagnostic operations, fluid inspections, repairs etc.). In some implementations, the asset 106 may be configured to provide the operating data in a single data stream, while in other implementations the asset 106 may be configured to provide the operating data in multiple, distinct data streams. For example, the asset 106 may provide to the analytics system 108 a first data stream of signal data and a second data stream of abnormal-condition data. As another example, the asset 106 may provide to the analytics system 108 a separate data stream for each respective sensor and/or actuator on the asset 106. Other possibilities also exist.

Signal data may take various forms. For example, at times, sensor data (or actuator data) may include measurements obtained by each of the sensors (or actuators) of the asset 106. While at other times, sensor data (or actuator data) may include measurements obtained by a subset of the sensors (or actuators) of the asset 106.

Specifically, the signal data may include measurements obtained by the sensors and/or actuators associated with a given triggered abnormal-condition indicator. For example, if a triggered fault code is Fault Code 1 from FIG. 3, then sensor data may include raw measurements obtained by Sensors A and C. Additionally or alternatively, the data may include measurements obtained by one or more sensors or actuators not directly associated with the triggered fault code. Continuing off the last example, the data may additionally include measurements obtained by Actuator B and/or other sensors or actuators. In some examples, the asset 106 may include particular sensor data in the operating data based on a fault-code rule or instruction provided by the analytics system 108, which may have, for example, determined that there is a correlation between that which Actuator B is measuring and that which caused the Fault Code 1 to be triggered in the first place. Other examples are also possible.

Further still, the data may include one or more sensor and/or actuator measurements from each sensor and/or actuator of interest based on a particular time of interest, which may be selected based on a number of factors. In some examples, the particular time of interest may be based on a sampling rate. In other examples, the particular time of interest may be based on the time at which an abnormal-condition indicator is triggered.

In particular, based on the time at which an abnormal-condition indicator is triggered, the data may include one or more respective sensor and/or actuator measurements from each sensor and/or actuator of interest (e.g., sensors and/or actuators directly and indirectly associated with the triggered indicator). The one or more measurements may be based on a particular number of measurements or particular duration of time around the time of the triggered abnormal-condition indicator.

For example, if a triggered fault code is Fault Code 2 from FIG. 3, the sensors and actuators of interest might include Actuator B and Sensor C. The one or more measurements may include the most recent respective measurements obtained by Actuator B and Sensor C prior to the triggering of the fault code (e.g., triggering measurements) or a respective set of measurements before, after, or about the triggering measurements. For example, a set of five measurements may include the five measurements before or after the triggering measurement (e.g., excluding the triggering measurement), the four measurements before or after the triggering measurement and the triggering measurement, or the two measurements before and the two after as well as the triggering measurement, among other possibilities.

Similar to signal data, the abnormal-condition data may take various forms. In general, the abnormal-condition data may include or take the form of an indicator that is operable to uniquely identify a particular abnormal condition that occurred at the asset 106 from all other abnormal conditions that may occur at the asset 106. The abnormal-condition indicator may take the form of an alphabetic, numeric, or alphanumeric identifier, among other examples. Moreover, the abnormal-condition indicator may take the form of a string of words that is descriptive of the abnormal condition, such as "Overheated Engine" or "Out of Fuel," among other examples.

Asset-related event data may take various forms as well. In example implementations, event data may include an indicator of the type of event that occurred (e.g., a fault code was triggered, diagnostics were run, a fluid anomaly occurred, etc.), a timestamp identifying when the particular event occurred, and/or a duration of time indicating how long the event occurred. Other examples are also possible.

The asset data platform 102, and in particular, the data intake system of the asset data platform 102, may be configured to receive operating data from one or more assets and/or data sources. The data intake system may be configured to intake at least a portion of the received data, perform one or more operations to the received data, and then relay the data to the data analysis system of the asset data platform 102. In turn, the data analysis system may analyze the received data and based on such analysis, perform one or more operations.

B. Providing Asset-Related Tools

As mentioned above, the asset data platform 102 may be configured to provide various asset-related tools that may take the form of a software application (e.g., a web application provided by the asset data platform 102 or a native application) that may be accessed, utilized, and/or displayed by a client station. Such tools may be configured to receive user inputs and in turn cause the asset data platform 102 to execute one or more operations. Example asset-related tools are discussed below. While these tools are discussed individually below, one of ordinary skill in the art will appreciate that any combination of these tools may be provided in a single software application.

1. Interactive Visualization Tool

One example tool may take the form of an interactive visualization tool that may display both event data and related signal data for an asset (or a group of assets) in a timeline view.

Figure 6:
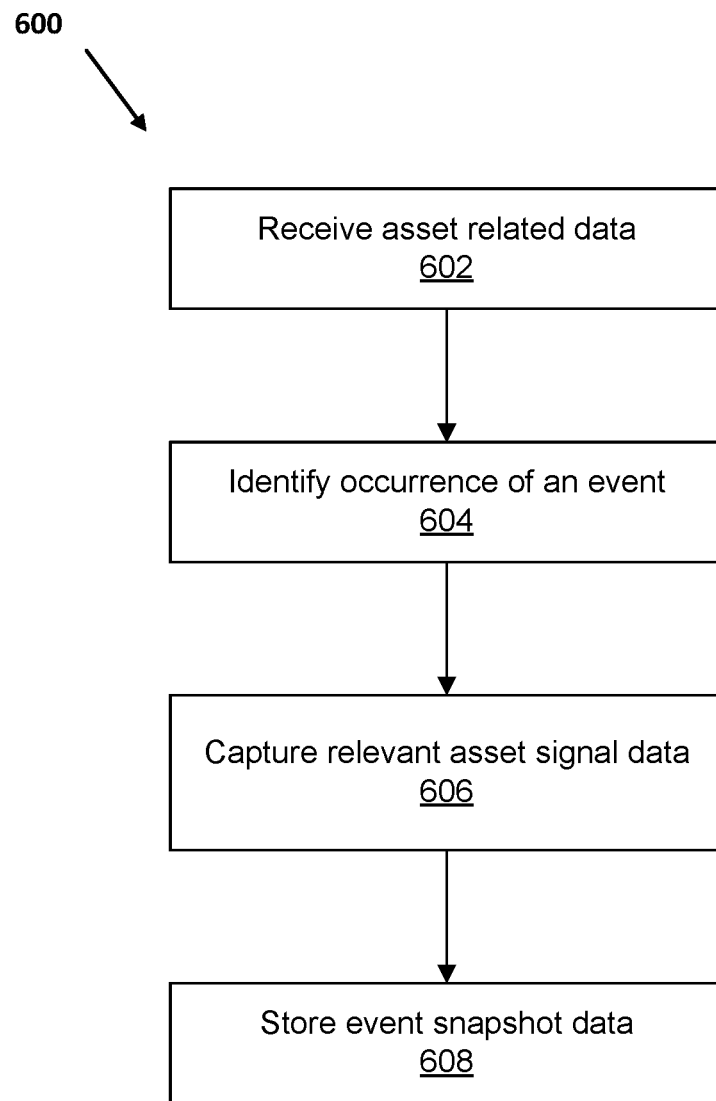
FIG. 6 is an example flow diagram that depicts an example method for creating event snapshot data.
Figure 7A:
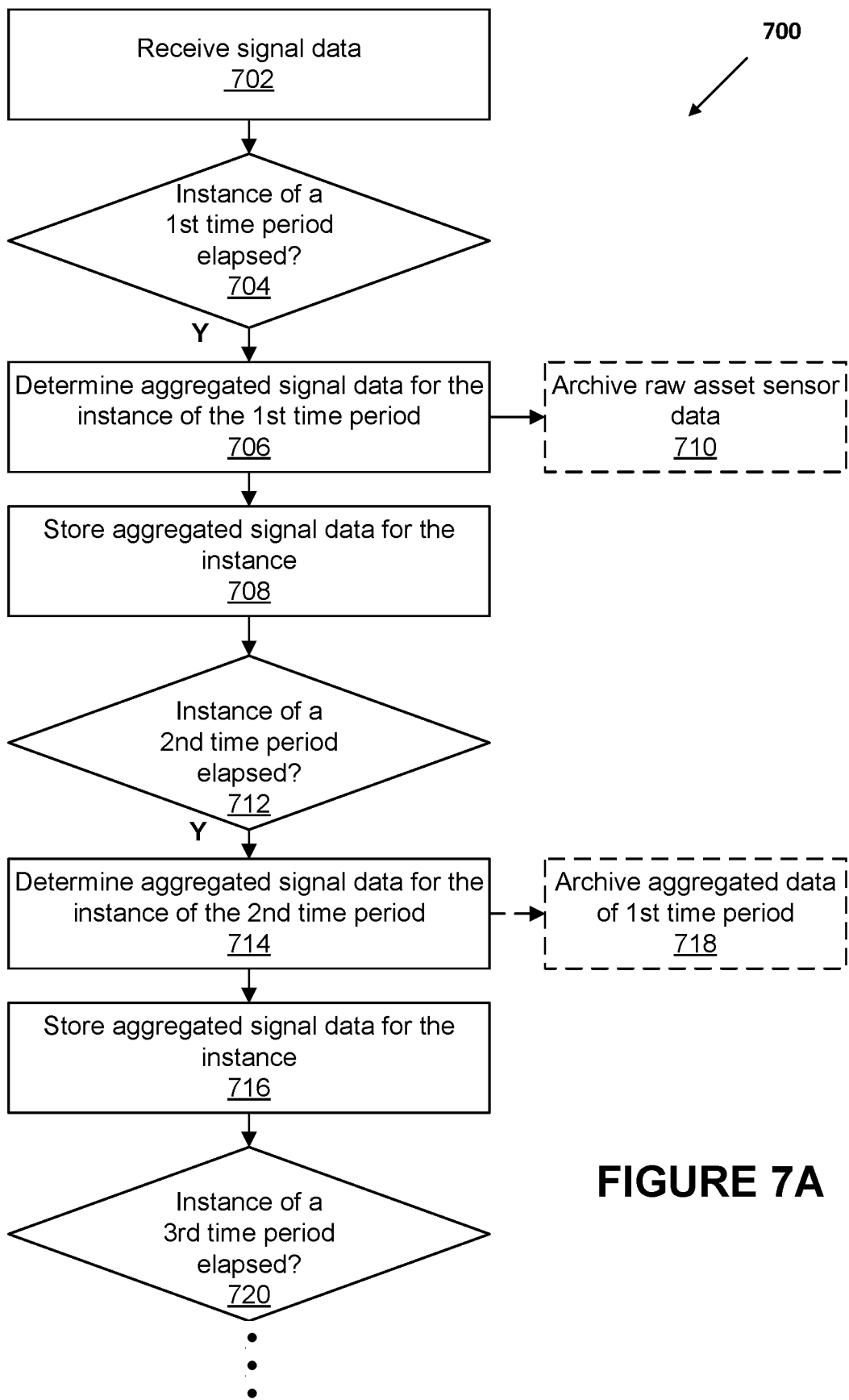
FIG. 7A is an example flow diagram that depicts an example method for creating and handling aggregated signal data.
Figure 8:
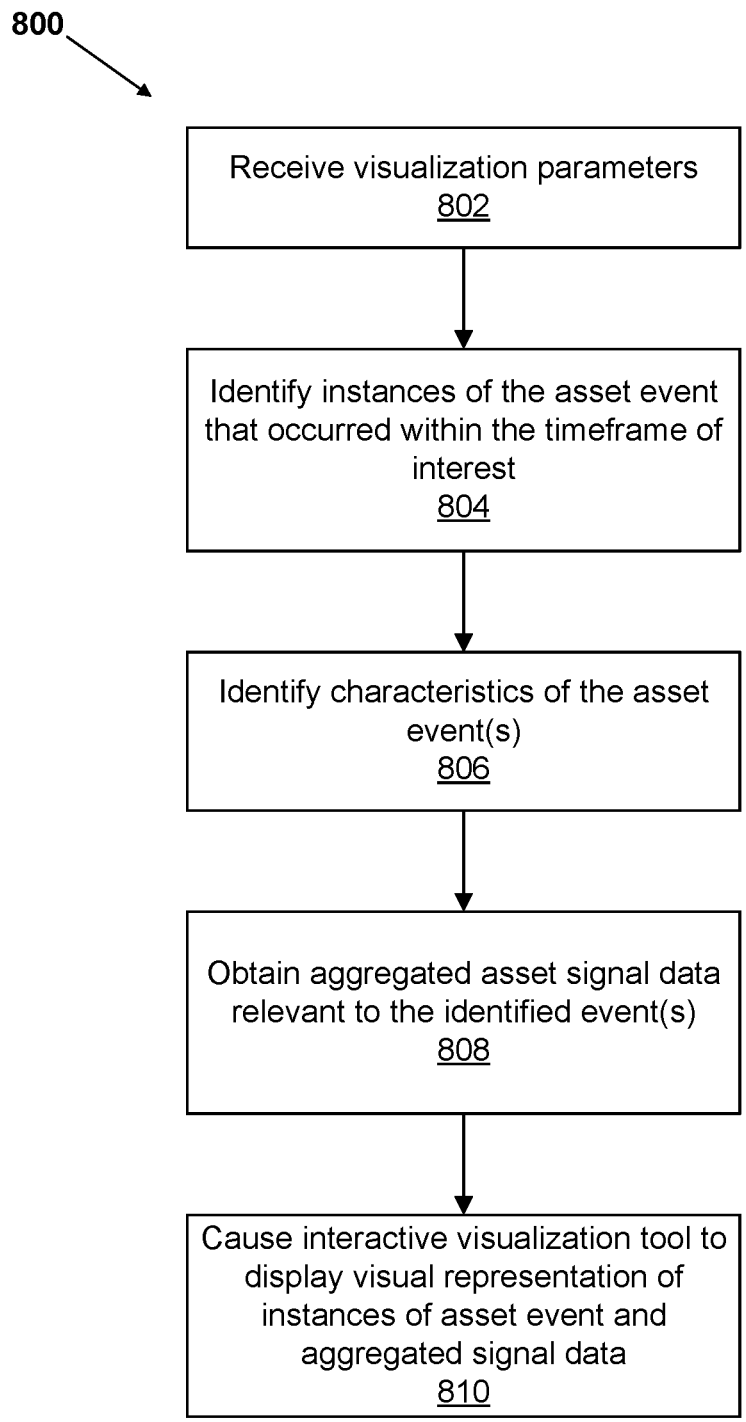
FIG. 8 is an example flow diagram that depicts an example method for populating a timeline of an example interactive visualization tool.

FIGS. 6, 7A, and 8 depict example methods 600, 700, and 800, respectively, that generally involve operations for facilitating the presentation of event data and related signal data on a timeline of the interactive visualization tool. For the purposes of illustration, the example methods 600, 700, and 800 are described as being carried out by the asset data platform 102, but these example methods may be carried out by other devices/systems. One of ordinary skill in the art will also appreciate that flow diagrams 600, 700, and 800 are provided for sake of clarity and explanation and that numerous other combinations of operations may be utilized to facilitate the presentation of event data and related signal data on a timeline view.

FIG. 6 is an example flow diagram that depicts one possible example method 600 for creating "event snapshot" data. At block 602, the asset data platform 102 may receive, via the data intake system, asset-related data. As previously mentioned, the asset data platform 102 may obtain asset-related data from various sources and may include a variety of data, such as signal data (e.g., raw sensor/actuator readings) and/or event data, among other data.

At block 604, the asset data platform 102 may identify an occurrence of an asset-related event based on the received asset-related data, which may occur in various ways. In one example, the asset data platform 102 may receive asset-related data that includes an event identifier and/or metadata that indicates an occurrence of a specific asset-related event. In such a case, the asset data platform 102 may parse the received asset-related data to recognize event identifiers and/or metadata that indicate an asset-related event occurrence. In another example, the asset data platform 102 may be configured to apply event rules to received signal data to determine whether or not an asset-related event has occurred. The asset data platform 102 may identify asset-related event occurrences in other ways as well.

At block 606, the asset data platform 102 may capture relevant signal data for each identified occurrence of an asset-related event. That is, the asset data platform 102 may capture sensor and/or actuator data that may be directly or indirectly associated with the identified asset-related event. The asset data platform 102 may determine relevant signal data in a variety of manners.

In one example embodiment, the asset data platform 102 may determine particular asset sensors and/or actuators that are associated with a given asset-related event, in some instances, by referencing entries stored in one or more local or remote databases that may define the respective asset signal sources (e.g., sensors and/or actuators) that are relevant to a given event. For instance, such an entry may define that an engine temperature sensor and coolant level sensor are relevant to an engine shutdown event. In other examples, the asset data platform 102 may receive from an external data source metadata or the like corresponding to received event data indicating signal sources that are relevant to a particular asset-related event. The relevant signal sources may be determined in other ways.

The asset data platform 102 may then capture, for each signal source (e.g., for each sensor and/or actuator) that was identified as being relevant to the given asset-related event, one or more signal measurements at or around the time of the event occurrence. In one instance, the asset data platform 102 may capture the one or more signal measurements based on a particular number of measurements for each identified signal source (e.g., five sensor measurements before and/or after an event occurrence). In another instance, capturing one or more measurements may be based on a particular duration of time around the event occurrence (e.g., a second's worth of measurements before and after an event occurrence). In some cases, the data captured may vary for each signal source type and/or event type and likewise may be based on other methodologies.

At block 608, the asset data platform 102 may store the captured data as event snapshot data in one or more databases or at a location within one or more databases for event snapshot data. In doing so, the asset data platform 102 may create a data entry in the one or more databases that may include various information, such as an event type/name, an indication of the asset whose operation triggered occurrence of the event, a timestamp indicating when the event occurred, and the captured signal data, among other possible information. Other ways of storing event snapshot data are also possible.

FIG. 7A is an example flow diagram 700 that depicts one possible example of creating and handling aggregated signal data. Generally, to help reduce the amount of data that the asset data platform 102 stores, the asset data platform 102 may be configured to generate aggregated signal data for a particular amount of time's worth of signal data (i.e., for a particular resolution of time), which it may do so for various amounts of time.

As shown, at block 702, the method 700 may involve the asset data platform 102 receiving raw signal data for an asset or group of assets. As mentioned above, a given signal data may include a raw value measured by a sensor or actuator (e.g., signal source), among other possibilities. In practice, the asset data platform 102 may receive signal data continuously (e.g., in "real time" or near real time), periodically, or in a "batch," among other possibilities. The way in which the asset data platform 102 receives signal data may depend on an asset type, signal source (e.g., particular sensor/actuator), configuration settings, and/or various other factors. In any case, the asset data platform 102 may store the received signal data in a first database, such as a "real-time" database, for use in creating aggregated signal data, among other uses.

At block 704, the asset data platform 102 may determine whether an instance of a first time period has elapsed. A given time period may be a predefined duration of time for which to create aggregated signal data. As such, a given time period may be defined to include a number of seconds, minutes, hours, days, months, years, etc., or any combination thereof.

In any event, the asset data platform 102 may determine whether an instance of the first time period has elapsed in a variety of manners. In one example, the asset data platform 102 may determine whether an instance of the first time period has elapsed via an internal clock. In another instance, the asset platform 102 may determine whether an instance of the first time period has elapsed in a more indirect fashion, such by counting raw signal measurements. For example, the asset data platform 102 may receive asset signal data once a second for a given asset, where that signal data includes values measured by a given sensor of the given asset. In such an example, if the first time period were equal to one minute, the asset data platform 102 may determine that a first time period has elapsed after receiving sixty sensor measurements. Numerous other examples are possible.

At block 706, the asset data platform 102 determines aggregated signal data for the instance of the first time period. For example, if the first time period is a minute, the asset data platform 102 may determine an aggregated signal data for each sensor and/or actuator from which it received data during that minute.

In example embodiments, a given aggregated signal data may take various forms. In one example, the aggregated signal data may take the form of a single value representative of the signal's value over the first time period. In other examples, the aggregated signal data may take the form of a signal summary for the given time period. A given signal summary may include one or multiple values representative of the particular signal's value over the particular time period. For example, a given signal summary may include one or more of the following values that are determined from the signal data for the particular time period: average, median, maximum, minimum, variance, first signal data value, and/or last signal data value, among other possibilities.

At block 708, the asset data platform 102 may store the aggregated signal data for the first time period in one or more databases or at a location within one or more databases that are for aggregated signal data for the first time period (e.g., the "minute" aggregated signal database). Alternatively, the aggregated signal data for the first time period may be stored in a single data structure for a particular timeframe (e.g., 24 hours), where the single data structure may also store aggregated signal data for other periods of time that differ in duration from the first period of time. In any event, such databases and/or data structures may be local or remote with respect to asset data platform 102.

FIG. 7B shows a conceptual illustration of an example data structure including aggregated data that has been stored. In this example, the asset data platform 102 stores aggregated data for a particular timeframe (e.g., 24 hours) in a single data structure (e.g., a single data table), although only 45 seconds' worth of aggregated data is depicted. In other examples, the asset data platform 102 may store aggregated data for a particular resolution of time (e.g., time period) in a data structure or database dedicated to that granularity of aggregation.

As shown in FIG. 7B, data table 750 comprises a granularity column 752, a start time column 754, a signal summary column 756, and a plurality of cells 758. Each row of the data table 750 corresponds to a given aggregation. Each cell 758 within the column 752 identifies the particular granularity (i.e., resolution) of the given aggregation. For example, the cell in the first row has a first granularity ("$G_1$"), such as 5 seconds' worth of signal data, the cell in the fourth row has a second granularity ("$G_2$"), such as 15 seconds' worth of signal data, and the cell in the ninth row has a third granularity ("$G_3$"), such as 30 seconds' worth of signal data.

Each cell 758 in the column 754 identifies the starting time of the signal data that the given aggregation represents, and each cell 758 in the column 756 stores a signal summary for the signal data that is aggregated. For example, the cell where the first row and column 756 intersect stores a signal summary (e.g., the minimum, maximum, average, and median signal values) for signal data from the timeframe beginning at $T_0$ to $T_0+G_1$ (i.e., the first 5 seconds' worth of signal data). As another example, the cell where the second row and column 756 intersect stores a signal summary for signal data from the timeframe beginning at $T_1$ to $T_1+G_1$ (i.e., the second 5 seconds' worth of signal data). Similarly, the cell where the fourth row and column 756 intersect stores a signal summary for signal data from the timeframe beginning at $T_0$ to $T_0+G_2$ (i.e., the first 15 seconds' worth of signal data). Likewise, the cell where the ninth row and column 756 intersect stores a signal summary for signal data from the timeframe beginning at $T_0$ to $T_0+G_3$ (i.e., the first 30 seconds' worth of signal data). The data table 750 shown in FIG. 7B is but one example of a data structure that stores aggregated signal data. Other examples are also possible.

Returning to FIG. 7A, at 710, the asset data platform 102 may optionally archive in remote storage and/or permanently clear from its local memory signal data that formed the basis of determining aggregated signal data in order to preserve the available memory. In example embodiments, the asset data platform may perform 102 such operations based on determining aggregated signal data. That is, the signal data that formed the basis of determining aggregated signal data may be archived and/or cleared from local memory as a byproduct of the aggregation. While in other example embodiments, these operations may be performed only after another period of time has passed (e.g., an hour, a day, thirty days, etc.), among other possibilities.

At block 712, the asset data platform 102 may determine whether an instance of a second time period has elapsed (i.e., a second resolution of time). For example, in view of the previously mentioned example, if the first time period were a minute the second time period may be an hour composed of sixty instances of a minute. In any event, the asset data platform 102 may determine whether a second time period has elapsed similar to block 704. Alternatively, in one particular example, the asset data platform 102 may determine that the second time period has elapsed based on a number of aggregated signal data values previously calculated. For instance, continuing the above example, the asset data platform 102 may determine that the hour has elapsed after sixty, one-minute aggregated signal data have been calculated for that hour. Other possibilities exist.

At block 714, the asset data platform 102 may determine an aggregated signal data for the instance of the second time period. In example embodiments, the aggregated signal data for the second time period may be based on signal data received at block 702 over the second time period and determined in line with block 706. In other embodiments, the aggregated signal data for the second time period may be based on the previously calculated aggregated signal data values for the first time period that are encompassed by the second time period. For example, the aggregated signal data for an hour may be determined based on the aggregated signal data of the sixty minutes that compose that hour. Other examples are also possible.

Similar to block 708, at block 716, the asset data platform 102 may store the aggregated signal data for the second time period in one or more databases or at a location within one or more databases that are for aggregated signal data for the second time period (e.g., the "hour" aggregated signal database). Alternatively, the aggregated signal data for the second time period may be stored in the same, single data structure where the aggregated signal data for the first time period was stored. For instance, back to FIG. 7B, the fourth row of data from the data table 750 may have been stored as a result of block 716. In any event, the databases and/or data structures may be local or remote with respect to the asset data platform 102.

At block 718, the asset data platform 102 may be configured to optionally archive and/or permanently clear from local memory the aggregated signal data corresponding to instances of the first time period that were encompassed by the second time period. Alternatively, one or both of these operations may be triggered by a number of other factors, such as the "age" of an aggregated signal data value. For example, any aggregated signal data that exceeds a certain age (e.g., sixty days) may be archived and/or permanently cleared. In another example, the handling of aggregated signal data may be dependent upon the aggregated database in which it is contained (i.e., the time period to which such data corresponds). For example, aggregated signal data values corresponding to a minute may be cleared after a day, whereas aggregated signal data values corresponding to an hour may be cleared after a week. The archiving and/or clearing of aggregated signal data values may be triggered in various other ways.

As indicated at block 720, the method 700 may continue for any number of time periods (e.g., day, month, year etc.) in a similar fashion to the functions described in reference to 702-718. For example, back to FIG. 7B, the ninth row of data from the data table 750 may have been stored as the method 700 continued past block 720 and handled aggregations for a resolution of time equivalent to $G_3$.

FIG. 8 is an example flow diagram that depicts an example method 800 for populating a timeline of the interactive visualization tool. At block 802, the asset data platform 102 may receive visualization parameters that take the form of data indicative of one or more selections made at the interactive visualization tool. In example embodiments, the visualization parameters may identify one or more assets of interest, one or more event types (e.g., a particular type of abnormal-condition indicators triggered, fluid analysis events, diagnostic events, etc.), a timeframe of interest, or any combination thereof, among other possibilities.

In practice, the asset data platform 102 may receive the visualization parameters based on one or more user inputs at the interactive visualization tool. In one particular example, a user may first launch the interactive visualization tool at his/her computing device (e.g., client station 112), and then the interactive visualization tool may receive one or more inputs that indicate the one or more selections discussed above. Based on such inputs, the interactive visualization tool may send to the asset data platform 102 data indicative of the selections.

In example embodiments, the asset data platform 102 may be configured to utilize a default timeframe of interest (e.g., the last 24 hours). In some instances, in the event that the asset data platform 102 receives data indicative of a selection of a timeframe of interest, the asset data platform may be configured to utilize the selected timeframe of interest instead of the default timeframe of interest. Other examples are also possible.

At block 804, the asset data platform 102 may identify instances of events matching the one or more event types that occurred within the timeframe of interest, which may be performed in a variety of manners. As one example of this operation, the asset data platform 102 may generate a query based on the visualization parameters received at block 802 that causes the asset data platform 102 to access one or more databases that contain asset-related data in order to identify occurrences of asset events that match the selected event types. In another instance, the interactive visualization tool may be configured to generate a query based on the received selections and thereafter transmit the generated query to the asset data platform 102.

In one particular implementation, based on the generated query, the asset data platform 102 may first access one or more databases containing event snapshot data in order identify instances within the timeframe of interest at which events of the selected event types occurred for the particular asset or group of assets. In particular, in one example case, the asset data platform 102 may access one or more event snapshot databases, identify occurrences of events that match any of the selected event types, and then filter those identified occurrences by the timeframe of interest. In other examples, the asset data platform may instead identify event snapshot data within the timeframe of interest and then identify occurrences of events that match any of the selected event types. Other examples are also possible.

At block 806, the asset data platform 102 may obtain event snapshot data for the identified instances of events. Based on the retrieved event snapshot data, the asset data platform 102 may identify additional characteristics of each event occurrence, such as the time at which a given event occurred, relevant signal sources (e.g., particular sensors and/or actuators), and/or relevant signal data (e.g., from block 606 of FIG. 6), among other possibilities.

The asset data platform 102 may then utilize the additional characteristics identified from the event snapshot data to obtain additional signal data, such as aggregated signal data. As one example embodiment, the asset data platform 102 may have retrieved event snapshot data related to an engine shutdown event within a given timeframe of t1-t10 and further identified characteristics indicating that the shutdown event occurred at t5 in addition to relevant signal sources related to the event occurrence (e.g., an engine temperature sensor and a coolant sensor). Based on the identified characteristics, the asset data platform 102 may then generate a second query to search one or more aggregated signal databases and/or data structures.

At block 808, the asset data platform 102 may obtain aggregated signal data relevant to the events corresponding to the retrieved event snapshot data. Generally, this operation may involve the asset data platform 102 accessing a particular database (e.g., a database that stores aggregated signal data for a particular resolution of time) or data structure. In some example embodiments, this operation may be based on the second query. In other example embodiments, this operation may be based on the timeframe of interest independent of the second query. In any event, continuing the previous example, the asset data platform 102 may obtain aggregated signal data for the engine temperature sensor and the coolant sensor that occur within the timeframe t1-t10.

In some embodiments, the asset data platform 102 may only obtain aggregated signal data that does not temporally overlap with the captured signal data of the retrieved event snapshot data. Continuing the above example, assume that the captured signal data of the retrieved event snapshot data comprises coolant and engine temperature measurements between t4-t6 (e.g., one second before and after the engine shutdown event). Because the asset platform already has signal data for times t4-t6, the asset platform 102 may retrieve only aggregated signal data for the coolant and engine temperature measurements from t1-t3 and t7-t10. The aforementioned example has been provided for the purpose of explanation only and should not be construed as limiting as numerous other examples exist as well.

In example embodiments, the asset data platform 102 may retrieve aggregated signal data based at least in part on the timeframe of interest. In this respect, the asset data platform 102 may incorporate the timeframe of interest into the second query generated for the purpose of obtaining aggregated signal data. For example, the asset platform 102 may be configured to obtain, for each relevant signal source identified by the second query, aggregated minute signal data for a timeframe of interest encompassing a few hours, aggregated hour signal data for a timeframe of interest encompassing a few days, aggregated daily signal data for a timeframe of interest encompassing a few weeks, and so on. Various other combinations are possible and may be based on setting configurations that are user or system defined.

In some example embodiments, the asset data platform 102 may be configured to obtain aggregated signal data based on the unit of time for the timeframe of interest. For instance, if the timeframe of interest is a certain range of days, then the asset data platform may be configured to obtain aggregated signal data from a day aggregated signal database, while if the timeframe of interest is a certain range of hours, then the asset data platform may be configured to obtain aggregated signal data from a hour aggregated signal database. Other examples are also possible.

At block 810, the asset data platform 102 may cause the interactive visualization tool to display a visual representation of the instances of the asset event and the aggregated signal data. In example embodiments, this operation may involve the asset data platform facilitating the preparation and presentation of a timeline view at the interactive visualization tool based at least in part on the event snapshot data and aggregated signal data retrieved at blocks 806 and 808, respectively. That is, the asset data platform 102 may cause a graphical user interface to display a visual representation of the asset event and signal data. Generally, the asset data platform 102 may facilitate the presentation of the timeline view by generating a visualization file or the like in a format that is renderable by the client station running the interactive visualization tool. In some cases, the asset data platform 102 may prepare the timeline for a particular instance by encoding it in a variety of formats, such as hypertext markup language, which may be transmitted to a client station as a data visualization file that includes html code, scripting code, and/or image files. Other examples are also possible.

In any event, a computing device running the interactive visualization tool, such as client station 112, may be operable to read a visualization file and cause the presentation of the visualization of the timeline view. In other instances, the asset data platform 102 may transmit data indicative of the retrieved event snapshot data and aggregated signal data to a computing device running the interactive visualization tool for both preparation and presentation. Additionally or alternatively, the preparation of the visualization of the timeline view may involve one or more intermediary devices, such as a server, and may be accomplished in any number of ways known to one of ordinary skill in the art.

In practice, the interactive visualization tool may cause a timeline to be displayed in a number of forms. In example embodiments, the interactive visualization tool may display representations of a selected timeframe, event types, event instances, and/or signal data, among other examples. In some cases, event instances and corresponding signal data may be displayed overlaid within a single pane or separated in different panes sharing a common timeline axis. In either case, the event instances and signal data may be displayed utilizing a multiple y-axis approach with the signal data and event instances displayed overlaid or separate from one another. Similarly, event instances of each identified event type may be displayed within a single pane or separate panes may be displayed for event instances of each event type. Other examples are certainly possible.

Additionally, the interactive visualization tool may dynamically highlight or otherwise indicate particular signal data and/or event instances that may be deemed of potential interest to a user, which may be based on analytics run by the asset data platform 102. The interactive visualization tool may present the timeline view in various other layouts and may incorporate additional interface elements.

Figure 9:
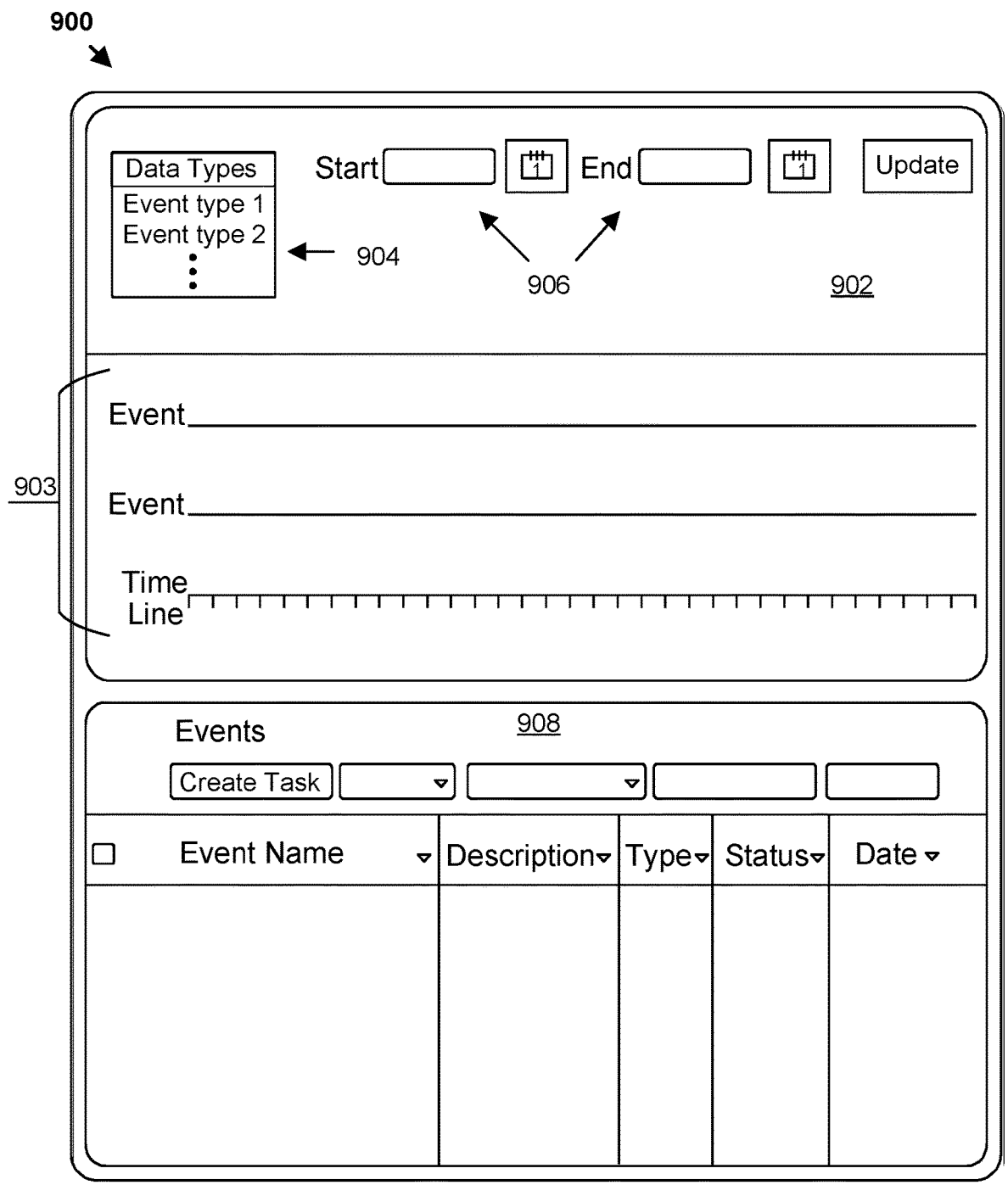
FIG. 9 depicts an example graphical user interface displaying an empty timeline.
Figure 10:
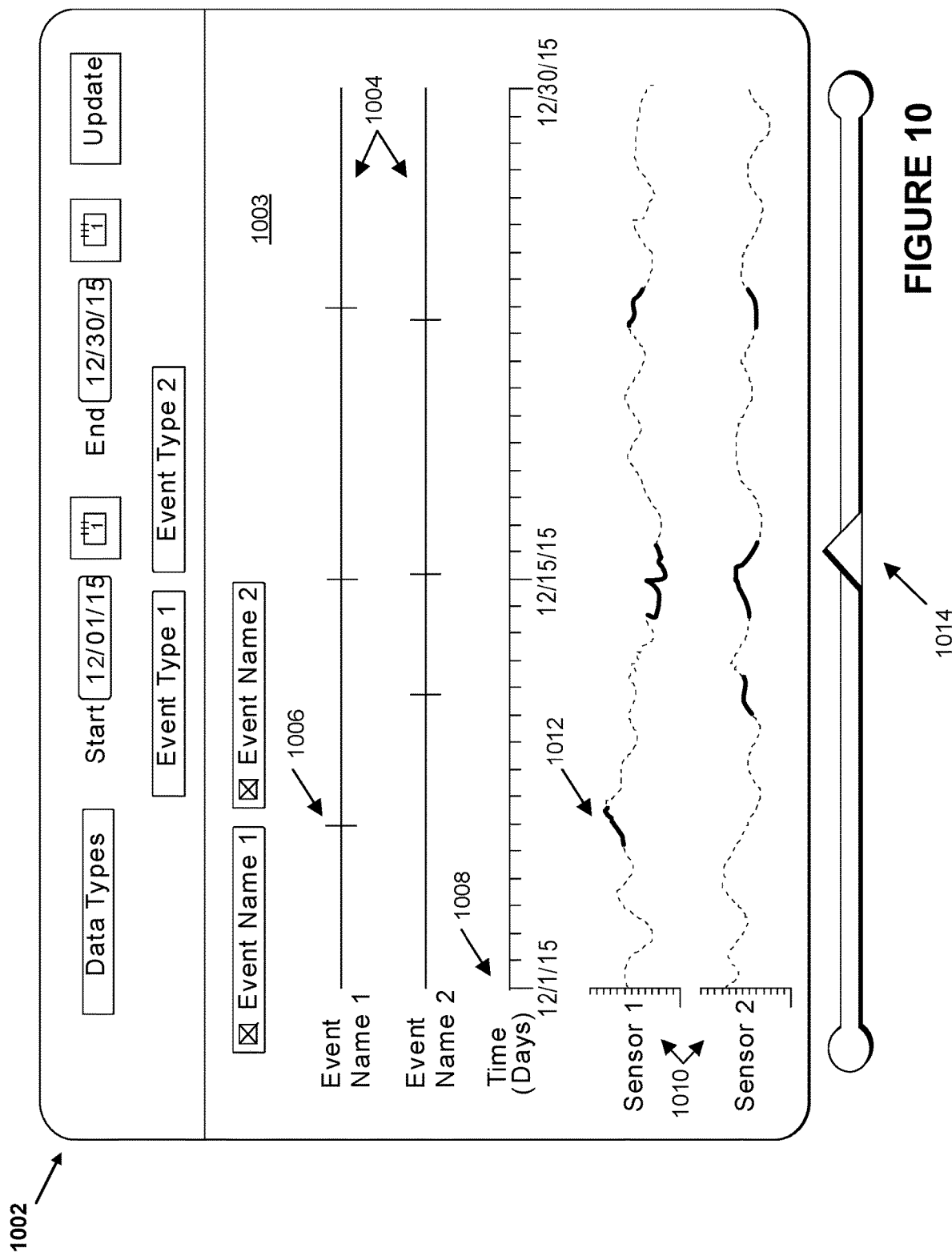
FIG. 10 depicts a portion of another example GUI displaying a populated timeline.
Figure 11:
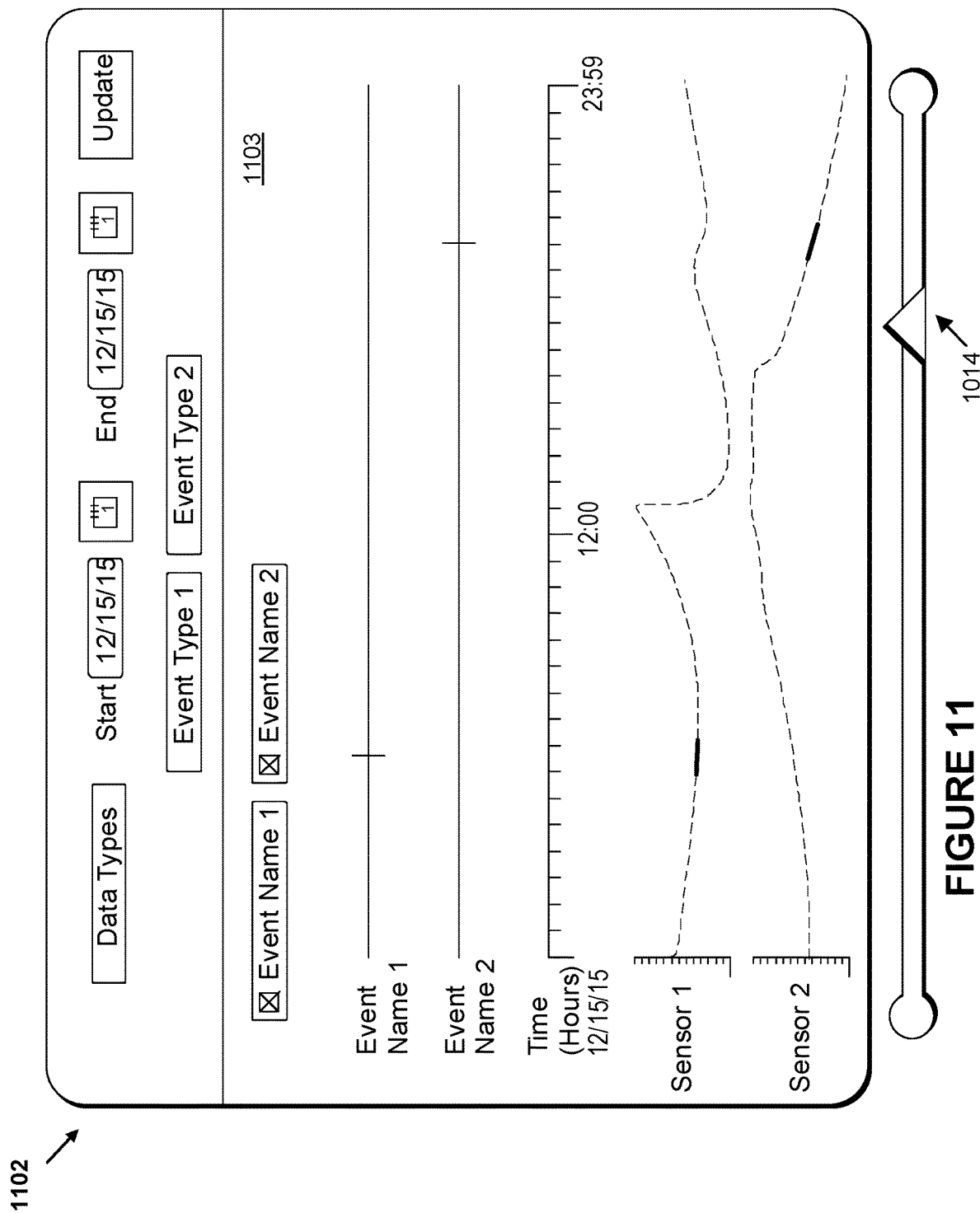
FIG. 11 depicts the portion of the GUI of FIG. 10 after an input to a selectable scrubber element.

FIGS. 9-11 are example graphical user interfaces that may be displayed by the interactive visualization tool. FIGS. 9-11 are presented for the purposes of example and illustration only and should not be construed as limiting. The interactive visualization tool may facilitate the presentation of a timeline view in a wide variety of forms, such as those addressed above. Further, the timeline view may contain additional or fewer elements than those presented in FIGS. 9-11.

FIG. 9 is an example interface 900 displaying an empty timeline. In operation, a user may utilize interface portion 902 to make various selections in order to define what should be presented in timeline pane 903. For example, a user may select from dropdown menu 904 one or more event types (e.g., asset shutdowns, restarts, diagnostic operations, fluid inspections, repairs, abnormal-condition indicators, etc.) and input a timeframe of interest in date fields 906. The interface portion 902 may include various other fields or menus corresponding to other forms of display criteria. As shown in this example interface 900, the timeline pane 903 includes a timeline axis and multiple event instance axes, each of which is not populated. In other examples, a timeline pane that is not populated may not be displayed.

The example interface 900 also displays an unpopulated event selection portion 908. In practice, once the timeline pane 903 is populated based on selections made via the interface portion 902, the event selection portion 908 may include a list of specific occurrences of events that occurred within the selected time frame, which may be displayed by event name (e.g., engine 1 shutdown, brake inspection, transmission fluid inspection, etc.). Additionally or alternatively, interface portion 908 may be used to display a list of signal types (e.g. sensor and/or actuator data) relevant to each individual event instance determined to have occurred within the selected time frame. Once the event selection portion 908 is populated, a user may select or deselect one or more event names and/or relevant signal data for the purposes of filtering and/or expanding the information displayed in the timeline pane 903.

After interface portion 902 is utilized to make one or more selections, a user may further provide an additional input indicating that the timeline pane 903 should be populated. For example, a user may select the "Update" button to cause the client station running the interactive visualization tool to send a query or a request to generate a query to the asset data platform 102. The timeline pane 903 may then be prepared and presented, based at least in part on the one or more selections, in the manner discussed in reference to FIG. 8. In other instances, the timeline pane 903 and/or the event selection portion 908 may be progressively populated as a user makes the selections in the interface portion 902 (e.g., without requiring the user to select the "Update" button). Other possibilities may also exist.

FIG. 10 is an example interface portion 1002 displaying a populated timeline pane 1003 that may be displayed in place of the interface portion 902 of FIG. 9. As shown, the interface portion 1002 may display an indication of the one or more user selections made via the interface portion 902 of FIG. 9, such as the event types (e.g., Event Type 1, Event Type 2) and the timeframe of interest (e.g., Dec. 1, 2015-Dec. 31, 2015), among other possible previously made selections. Additionally, the interface portion 1002 may display an indication of the specific event occurrences of the event types that occurred during the selected timeframe (e.g., Event Name 1, Event Name 2).

The timeline pane 1003 may display various areas that contain visualizations representative of one or more user selections and/or data related to the determined event instances. As shown, the timeline pane 1003 includes a time axis 1008 on which the selected timeframe may be displayed, one or more event instance axes 1004, each of which may display one or more indications of event occurrences 1006, and one or more signal plots 1010 to display one or more measurements relevant to the event occurrences.

In particular, FIG. 10 depicts a situation in which a user has selected two event types (e.g., Event Type 1, Event Type 2), and a timeframe of interest of December 2015. Based on such selections, the asset data platform 102 may have identified instances of two specific events (e.g., Event Name 1, Event Name 2) that are of the selected event types that occurred during the selected timeframe. As described in reference to FIG. 8, the asset data platform 102 may have additionally determined from the event snapshot data particular signal types relevant to the identified occurrences of the events. For the sake of simplicity, we may assume for the purposes of FIG. 10 that the asset data platform 102 has determined only a single signal type to be relevant to each specific event name that occurred within the selected timeframe. Namely, Sensor 1 may be relevant to Event Name 1 and Sensor 2 may be relevant to Event Name 2. However, it is should be understood that each specific event may be related to any number of signal types.

As previously discussed, the asset data platform 102 may facilitate the preparation and presentation of the timeline view by retrieving event snapshot data and aggregated signal data values relevant to the events occurring within a selected time frame. In this respect, the timeline pane 1003 may display representations of the retrieved event snapshot data and aggregated signal data values in a visually distinguishable manner. As seen in FIG. 10, the sensor plots 1010 may contain continuous data portions, such as 1012, which may correspond to event snapshot data captured at or around the time of an event occurrence, and discrete data portions which may correspond to aggregated signal data relevant to the event occurrence and within the selected timeframe. In the example interface of FIG. 10, each individual event instance of Event Name 1 and Event Name 2, indicated on the event instance axes 1004, respectively corresponds to a displayed event snapshot on the signal plots 1010 for Sensor 1 and Sensor 2.

In other instances, the timeline pane 1003 may display representations of the retrieved event snapshot and aggregated signal data in a visually indistinguishable manner. That is, the sensor plots 1010 may display representations of the retrieved data in a continuous fashion (i.e., an unbroken or otherwise "smooth" plot). The asset data platform 102 and/or a computing device running the interactive visualization tool may facilitate the presentation of a "smooth" plot by applying any number of curve-fitting techniques to the retrieved event snapshot and/or aggregated signal data values.

The example interface of FIG. 10 is merely one example of how the interactive visualization tool may present a timeline. As previously addressed, the event instances indicated on the event instance axes 1004 and signal data indicated on the signal plots 1010 may be displayed overlaid on one another, utilizing a multiple y-axis approach. Furthermore, the timeline view may incorporate any number of event instance axes and/or relevant signal data plots.

Moreover, the interface portion 1002 may further display a scrub bar and scrubber element 1014 that is associated with the timeline pane 1003 that may be selectable to zoom in or out of a displayed timeline, while also altering the aggregated signal data that is displayed. In essence, an input to the scrubber element 1014 may cause the asset data platform 102 to access a different set of aggregated signal data.

As shown in FIG. 10, the scrubber element 1014 may be located at the center of the scrub bar when the timeline pane 1003 is initially populated. As discussed above, the asset data platform 102 may retrieve the relevant aggregated signal data based at least in part on the selected timeframe. For example, from FIG. 9, the interactive visualization tool may have received a timeframe selection of a month (e.g., December 2015). In response to the selected time frame, the asset data platform 102 may have retrieved relevant day aggregated signal data from a day aggregated signal database or from day-granularity entries from one or more data structures for use in populating the timeline pane 1003. As one illustrative example, returning to FIG. 7B, the asset data platform 102 may have obtained aggregated signal data from the data table 750 from each row having a granularity of "$G_2$". Various other possibilities may also exist. However, an input indicating a selection of the scrubber element 1014 may cause the asset data platform 102 to retrieve different aggregated signal data corresponding to a different granularity of time (e.g., from an aggregated signal database other than the day aggregated signal database).

FIG. 11 depicts an example interface portion 1102 resulting from an input to the scrubber element 1014 of FIG. 10. As shown in FIG. 11, the interactive visualization tool has received an input to scrubber element 1014 leading to the scrubber element 1014 being displayed as moved rightward on the scrub bar. Furthermore, in response to the input, the interactive visualization tool may have caused a zoomed in view of the displayed timeline from FIG. 10 to be displayed in timeline pane 1103. In particular, the timeline pane 1103 displays a zoomed in day view of a particular day within the initially selected timeframe (e.g., December 2015), although other examples are also possible. In such an instance, the received zoom input to the scrubber element 1014 may have caused the asset data platform 102 to retrieve hour aggregated signal data from an hour aggregated signal database or from hour-granularity entries from one or more data structures to be used in facilitating the preparation and presentation of the zoomed in timeline view. As an illustrative example, returning to FIG. 7B, the asset data platform 102 may have obtained aggregated signal data from the data table 750 from each row having a granularity of "$G_1$". Likewise, a zoom out operation (not shown) may cause the asset data platform 102 to access yet another aggregated signal database or different entries from one or more data structures and cause to be displayed aggregated data values calculated for a longer duration of time of time (e.g., six months, year, etc.). As an illustrative example, returning to FIG. 7B, the asset data platform 102 may access from the data table 750 aggregated signal data from each row having a granularity of "$G_3$" as a result of the zoom out operation.

Furthermore, in some instances, an input to a scrubber element may not result in the retrieval and display of a new set of aggregated signal data. Such instances may occur for example if another set of aggregated signal data is no longer available (e.g., because such data was archived and/or permanently cleared). In this situation, the interactive visualization tool may still receive an input to cause the timeline to be zoomed in or out, but the aggregated signal data utilized in the sensor plots may remain the same. In another instance, the interactive visualization tool may not allow a timeline to be zoomed in or out when the asset data platform 102 determines that aggregated signal data for the zoomed time frame is unavailable. Other examples are also possible.

2. Task Creation Tool

Another example tool may take the form of a task creation tool that may leverage one or more predictive models executed by an asset data platform to help provide to a user suggested asset-related tasks and/or aspects thereof. Similar to the interactive visualization tool discussed above, the task creation tool may be a software application (e.g., a web application provided by the asset data platform 102 or a native application) that runs on a client station and receives data from the asset data platform. In practice, a first user (e.g., the "task creator") might utilize the task creation tool to create a particular task that is then provided to a second user (e.g., a mechanic or the like) that may or may not carry out the task.

Generally, the task creation tool facilitates creating a task that is intended to address the occurrence of one or more particular events of a given asset. For instance, a task might include one or more recommended repairs, maintenance, or inspection that a mechanic or the like should undertake in view of an issue at a given asset (e.g., an over-heating engine). As such, for a given task, the task creation tool is configured to provide a number of task-fields that may be user or machine populated (e.g., the task creation tool, the asset data platform, or some combination thereof). Examples of task fields include an asset identifier, asset-event identifiers, recommended action(s), recommended literature (e.g., repair manuals, component specifications, asset schematics, etc.) repair costs, and inaction costs, among numerous other possibilities. Depending on the particular task, additional or fewer task-fields may be provided.

FIG. 12 depicts an example graphical user interface (GUI) 1200 that may be displayed by a client station when operating the task creation tool. As shown, the GUI 1200 may include a plurality of fields associated with a task that may receive a textual input or a dropdown selection. Some of the example fields include Recommendation Name, Equipment Details, Problem, Recommended Action, and Recommendation Cost (e.g., repair cost and/or inaction cost).

Additionally, the GUI 1200 may further include sections configured to receive and display information that are related to the task. For example, a user may attach Supplemental Information, which may take the form of files that are related to the task (e.g., signal data plots, pictures or video of an asset, audio instructions, etc.). In another example, the task creation tool may be configured to display recommended literature related to the task (e.g., repair manuals, parts specifications, cost breakdowns, etc.). It should be noted that FIG. 12 is provided as merely one possible example of a GUI of the task creation tool and it is understood that additional or fewer elements and/or fields may be displayed. Additionally, the task creation tool may display various versions of the GUI depending on factors such as the asset type (e.g., locomotive, airplane, generator, etc.,) and/or event(s) selected to create a task for, among other possibilities.

In example implementations, a user may cause the task creation tool to display the GUI in various ways. In most instances, a user may begin creating an asset-related task by providing one or more inputs at the task creation tool. In such instances, a user may first select at the task creation tool an indication of a particular asset(s). In response to the selection of the particular asset(s), the computing device running the task creation tool may transmit a request to the asset data platform 102 to retrieve for the selected asset any asset-related events that previously occurred for that asset. As noted above, asset-related events may take the form of on-asset events (e.g., occurrences of abnormal conditions), asset repair/maintenance/inspection events, external fluid inspection/testing events, etc. In one instance, the asset data platform 102 may retrieve, in response to the request, all the past occurrences of events for an asset, whereas in other instances the asset data platform 102 may only retrieve a subset of past events based on various factors. For example, the asset data platform 102 may only receive a predefined number of events (e.g., the last 100 event occurrences), events within a certain timeframe (e.g., event occurrences in the past month), and/or events of a given severity (e.g., critical event occurrences), among other possibilities. Once the asset data platform 102 retrieves the past event occurrences for the selected asset, it may transmit such data to the computing device, indications of which may in turn be displayed by the task creation tool. The retrieval of past event occurrences corresponding to the selected asset may be accomplished in a variety of other ways.

After the task creation tool displays indications of the past event occurrences, it may further receive an input selecting one or more of the event indications for which a task is desired to be created. Additionally, the task creation tool may present to a user one or more user selectable elements (e.g., icons), before or after the selection of one or more indications of a past event occurrences, that generally dictate how the GUI of the task creation tool is populated. In such instances, the one or more user selectable elements may each correspond to different ways to both access the GUI of the task creation tool and to create a task for the previously selected event occurrence indications.

In one instance, the task creation tool may receive, via a first user-selectable element, a first input indicating that a user desires to manually create a task. Thereafter, the task creation tool may display the GUI of the task the creation tool in a manner such that all (or nearly all) of the included fields are unfilled. A user may then input into each field of the GUI information regarding the task they wish to create. For example, the user may input, via the GUI, a name of the recommendation, a problem, recommended action, among other possibilities. In addition, the user may manually search and/or browse for supplemental information and literature to include in the task. In other examples, the task creation tool may cause certain fields to be automatically filled (e.g., pre-populated) after receiving the first input. In one particular example, the fields corresponding to Equipment Details fields of GUI 1200 may be automatically filled based on data received from asset data platform 102 regarding selected asset(s). Other GUI fields may be automatically filled as well.

In another instance, the task creation tool may receive, via a second user-selectable element, a second input indicating that a user desires to receive suggested tasks. In such a case, the task creation tool may facilitate the transmission of a request to the asset data platform to execute one or more predictive models in response to receiving the second input. In turn, the asset data platform may provide back to the tool one or more suggested tasks for a particular asset based on executing one or more predictive models with signal data and/or event data for the particular asset. The task creation tool may then display the one or more suggested tasks, at which point the user may accept, modify, or decline the suggested tasks. Alternatively, the task creation tool may include a "setting" or the like that the user can select that causes the task creation tool to receive suggested tasks from the asset data platform.

In particular, in response to the second input, the client station running the task creation tool may instruct the asset data platform to provide one or more suggested tasks. The asset data platform 102 may respond to such an instruction by first identifying one or more assets for which to provide the one or more suggested tasks. For example, the client station's instruction may include asset identifying information (e.g., identifiers of one or more assets selected by a user), in which case the asset data platform may identify the one or more assets based on that asset identifying information included in the instruction. As another example, the asset data platform may identify one or more assets that are associated with the client station that sent the instruction (e.g., if the client station is associated with an organization that operates a certain set of assets). For each such asset, the asset data platform may identify whether there are any "active" events for the given asset. An active event may be any asset-related event within a particular amount of time in the past that has not yet been addressed, resolved, dismissed, etc. If any such events exist, the asset data platform may then run one or more predictive models based at least on one or more of the identified active events.

Generally, the one or more predictive models may analyze the active events and/or signal data related thereto and output a likelihood that a given task should be created based on one or more of the active events. In this way, the asset data platform suggests a task that a user might otherwise manually create to address the active events. In practice, a model for suggested tasks may be defined in a number of manners.

In one example, the model may be defined based at least on historical asset-event data and historical task data for a plurality of assets. The asset data platform may access the historical task data indicating past occurrences of a given task and then identify one or more active events that existed at or around the time of each such past occurrence. In turn, the asset data platform may define a relationship between the existence of active events and the likelihood that the given task should be created to address such events (or a subset of such events). This defined relationship may embody a model for suggesting a task. The asset data platform may define such a model for each of various different tasks. (It should also be understood that individual task models may be combined together or otherwise considered to be a single model).

In practice, this relationship (and thus the model) may be defined in a number of manners. In some example implementations, the asset data platform may define the predictive model by utilizing one or more supervised learning techniques, such as a random forest technique, logistic regression technique, or other regression techniques. In other example implementations, the asset data platform may define the predictive model by utilizing one or more unsupervised learning techniques. Other examples are possible as well.

In a particular example, defining the predictive model may involve the asset data platform generating a response variable that defines the times of interest during which to analyze the historical event data. The response variable may be a binary-values response variable such that is assigned a value of one for times of interest (e.g., times leading up to the creation of a task) and is otherwise assigned a value of zero.

Continuing in the particular example of defining the predictive model based on a response variable, the asset data platform may train the predictive model with the historical event data and the generated response variable. Based on this training process, the asset data platform 102 may then define a predictive model that receives as inputs various active asset events and outputs a probability between zero and one that a particular task might be advisable based on those active events.

The asset data platform may then repeat this process to define a respective predictive model for each of various other tasks.

The model for suggesting tasks may be defined in other ways as well. As one particular example, the asset data platform may be configured to define the model based on one or more survival analysis techniques, such as a Cox proportional hazard technique. Other examples are also possible.

In some implementations, in addition to historical asset-event data and historical task data, the model for suggesting tasks may also be defined based on other data, such as signal data underlying the asset-event data and/or feedback data regarding the historical tasks. The feedback data may indicate whether a task successfully addressed the one or more active events for which the task was created. Other examples are also possible.

In operation, the asset data platform may be running a plurality of predictive task models, each corresponding to a respective task. These predictive task models may each take as input a list of active events for a given asset. In turn, each predictive task model may iterate through various combinations of active events and then output an indication of a likelihood that the model's respective task should be created based on at least one combination of active events. In this respect, the predictive task model may also return an indication of a particular combination of active events that is associated with the outputted likelihood. It should also be understood that the model could generate a plurality of likelihoods, each corresponding to a different combination of active events, in which case the model may output a representative likelihood value that takes the form of a maximum likelihood, an average likelihood, etc.

In some implementations, the execution of the predictive model may also involve one or more pre-processing functions. For example, before inputting the list of active events into a given predictive task model, the asset data platform may filter or reorganized the list of active events to based on the nature of the given predictive task mode. Other examples are possible as well.

Once the asset data platform executes the one or more predictive task models, the asset data platform may then cause one or more suggested tasks to be presented via the task creation tool. In one example, the asset data platform may provide a client station running the task creation tool with a list of each task having a non-zero likelihood along with a corresponding indication of the likelihood that the task should be created. In another example, the asset data platform 102 may only provide a client station running the task creation tool with an indication of each suggested task having a likelihood that exceeds a confidence level threshold (e.g., a value between 0-1). This confidence level threshold may take the form of a fixed or variable value that is defined by a computing device or a user.

After receiving the one or more suggested tasks from the asset data platform, the client station running the task creation tool may display one or more suggested tasks to the user. In turn, a user may choose to accept a suggested task, which may then cause the task creation tool to launch a new task GUI such as the one described above with various fields associated with the suggested task having been pre-populated (e.g., a problem and recommended action).

In response to a user's instruction to launch a new task GUI (e.g., based on the manual selection of active events or based on a suggested task), the task creation tool may also be configured to instruct the asset data platform to execute one or more predictive models that are used to pre-populate certain fields in the task GUI. As one example, the asset data platform may be configured to execute one or more predictive models that receive as inputs the data used to define the task (e.g., the one or more events on which the task is based) and output a likelihood that each of one or more knowledge article should be included in the task (e.g., repair manuals, parts specifications, cost breakdowns etc.). Based on this output, the asset data platform may then cause a client station running the task GUI to populate the recommended literature task field with one or more knowledge articles (e.g., in the form of a ranked list).

In an example embodiment, each such predictive model may analyze the one or more events that were selected to be addressed by the task that is currently being created and output a likelihood that a given knowledge article might be useful for the task. In this way, the asset data platform predicts knowledge articles that might be useful for a task a user is creating to address one or more particular events. In practice, a model for predicting a knowledge article may be defined in a number of manners.

In one embodiment, the model may be defined based on some combination of historical asset-event data, historical task data, and/or historical knowledge article data indicating knowledge articles that have been used in the past in connection with particular events and/or tasks. For instance, the asset data platform may first access the historical knowledge article data indicating past uses of a given knowledge article and then access the historical asset-event and/or task data to identify events and/or tasks that were associated with each past use of the given knowledge article. In turn, the asset data platform may define a relationship between a given set of one or more asset-related events and the likelihood that the given knowledge article should be included in a task created based on such events. This defined relationship may embody a model for suggesting a knowledge article. The asset data platform may define such a model for each of various different knowledge articles. (It should also be understood that individual knowledge-article models may be combined together or otherwise considered to be a single model).

In practice, this relationship (and thus the models) may be defined in a number of manners. In example implementations, the asset data platform may define the predictive models for suggesting knowledge articles in a similar manner to the above-described techniques for defining predictive task models. Other examples are also possible.

After the asset data platform executes the one or more knowledge-article models (e.g., in response to a user input to create a task based on one or more events), the asset data platform may provide the client station running the task creation tool with an indication of one or more knowledge articles. For example, the asset data platform may provide a client station running the task creation tool with a list of each available knowledge article along with a corresponding indication of the likelihood that the knowledge article should be included in the task. In another example, the asset data platform 102 may only provide a client station running the task creation tool with an indication of each knowledge article for which the predictive task model's output exceeds a confidence level threshold (e.g., a value between 0-1). This confidence level threshold may take the form of a fixed or variable value that is defined by a computing device or a user.

The task creation tool may then populate the task GUI's field for recommended literature with an indication of one or more knowledge articles, which may be listed in order of most likely to be useful or most frequently include in similar tasks. A user may then select one or more of the displayed indications, thereby adding the particular knowledge articles to the given task.

In some instances, the task creation tool may be configured to transmit a created task to another computing device(s) for the purposes of allowing one or more additional users to take action in regard to the created task (e.g., implement a recommended action). In other instances, the task creation tool may cause one or more actions to be triggered based on a created task, such as for example, ordering of parts relating to the task, scheduling the maintenance required by the task, among many other possible actions.

As suggested above, feedback related to recommended tasks or portions thereof may be utilized for defining and/or updating predictive models. In example embodiments, actions related to a recommended task or suggestion within a task field may be used as feedback data for defining and/or updating the predictive models that helped make the recommendation or suggestion in the first place. For example, if a user selects a recommended task or representation of an asset-task suggestion populated in a task field, data indicative of such a selection might be sent back to the asset data platform 102, which may then utilize this selection as positive feedback for the one or more predictive models that helped originally make the recommendation or suggestion. On the other hand, if a user declines to select the recommended task or representation of the asset-task suggestion populated in the task field, the asset data platform 102 may infer that this is an indication of negative feedback and modify the one or more predictive models that helped originally make the recommendation or suggestion accordingly. Likewise, an indication that a recommended task or aspect thereof successfully (or unsuccessfully) addressed the one or more particular events of the given asset may be utilized as feedback for the predictive models. Other examples of feedback are also possible.

3. Rule Creation Tool

Another example tool provided may take the form of a rules creation tool that may be configured to create new asset-related rules that may be applied at the asset data platform 102 to trigger an event. Similar to the tools discussed above, the rule creation tool may be a software application (e.g., a web application provided by the asset data platform 102 or a native application) that runs on the client station 112 and receives data from the asset data platform 102.

Traditionally, such rules may be defined when an asset data platform is first implemented or when the organization whose assets the rules apply to first starts utilizing an asset data platform and/or such rules may only be modified by, for example, an administrator of an asset data platform. The rules creation tool described below may allow for dynamic creation and/or modification of asset-related rules and/or may allow individuals other than the administrator to make changes.

Typically, the asset data platform 102 may store and monitor one or more asset-related rules for a given asset or set of assets, where each rule includes respective triggering conditions. The one or more asset related rules may take a number of forms. In one respect, the asset-related rule may correspond with one or more signal measurement values (e.g., sensor and/or actuator data) that must be satisfied before an asset-related event is triggered. In one example, the asset-related rule may be a hi-low threshold rule, wherein the asset data platform 102 may trigger an event based upon one or more signal measurements either exceeding or falling below a threshold level. For example, two distinct events may be triggered dependent upon whether a measurement recorded by a temperature sensor is greater or less than a given temperature threshold level. It is contemplated that the hi-low threshold rules may incorporate any number of signal types as well as threshold levels.

In another example, the asset-related rule may be a rate of change rule, where an event may be triggered based on one or more signal measurements varying by a predefined degree over a predefined period of time (e.g., rate of change threshold). In one particular example, such an abnormal-condition rule may define that an event is to be triggered based upon an occurrence that a temperature measurement, taken by a particular sensor, varies by more than ten degrees within a five-minute period of time. Various other possibilities of rate of change asset-related event rules exist, and may incorporate any number of signal types and rate of change thresholds. Other examples of asset-related rules are possible as well.

In example implementations, the rules creation tool may facilitate creating asset-related rules in a number of ways. In one such implementation, the rules creation tool may create asset-related rules based upon user inputs at the rules creation tool. That is, the rules creation tool may include one or more rule fields that a user may populate and a selectable element that causes the asset-related rule to be created based on the populated fields and content therein. For example, a user may first identify asset(s), signal types (e.g., sensor and/or actuator data), and threshold values for the selected signal types via respective rule fields and then provide an input indicating that a new asset-related rule should be created. Additionally, the task creation tool may include one or more action fields through which a user may identify one or more actions they desire to occur upon the event corresponding to an asset-related rule being triggered. For example, a user may desire to receive a notification upon the event being triggered, a diagnostic check to be scheduled upon the event being triggered, among other possibilities.

In another implementation, the rules creation tool in combination with the asset data platform 102 may be configured to recommend a new asset-related rule, which may then be displayed to a user via the rules creation tool. In response to the recommendation of a new-asset related rule being displayed, the user may provide an input indicative of accepting, modifying, or declining the recommendation. In this respect, the asset data platform 102 may determine whether to recommend a new-asset related rule, for a given organization or asset(s), based on various analytics. For example, such analytics may take the form of an analysis of asset-related rules created by other organizations that monitor similar assets. In another example, the analytics may take the form of one or more predictive models that generally output a likelihood that an asset-related rule recommendation should be output, based at least in part on historical signal data received from one or more assets. Recommendations of new asset-related rules may be provided based on other possible factors.

Upon the creation of a new asset-related rule, the rules creation tool may cause the asset data platform 102 to store the asset-related rule in one or more rule databases. The asset data platform 102 may then subsequently apply the stored rule to asset-related data for assets of a particular type or for assets of a particular organization and trigger an event when the conditions of any stored rule is triggered. That is, the asset data platform 102 may check received asset-related data against the rule parameters (e.g., asset(s), signal type(s), threshold value(s)) in order to determine whether or not to trigger an event corresponding to the created asset-related rule.

In some implementations, the asset data platform 102 may output an indication upon a determination that one or more asset-related event rules are satisfied. In some instances, asset data platform 102 may transmit the outputted indication to an asset or a computing device (e.g., client station 112) for audible or visual display. In other cases, the outputted indication may cause the asset data platform 102 to create an event snapshot data entry to be created for use in conjunction with the interactive visualization tool. Other possibilities also exist.

4. Metadata Tool

Another example tool may take the form of a metadata tool that may be configured to associate additional information with an asset(s) identifier(s), which may help make identifying asset-related data of interest or trends thereof more efficient. Similar to the above-discussed tools, the metadata tool may take the form of a software application (e.g., a web application provided by the asset data platform 102 or a native application) that runs on client station 112.

Generally, the asset data platform 102 may associate received asset-related data (e.g., signal data, event data, etc.) with a particular asset via an asset identifier that may accompany such asset-related data when transmitted to asset data platform 102. In this respect, the asset data platform 102 may maintain one or more databases that contain entries that correlate received asset-related information to each of the asset identifiers. In one example, the information contained in an entry for an asset identifier may include an asset type (e.g., train, airplane, etc.), model, serial number, and asset age, among other possibilities. As seen from the aforementioned example, the asset information associated with an asset identifier is typically related to permanent features of the asset (i.e., what the asset is).

The metadata tool disclosed herein enables the asset data platform 102 to associate additional information with an asset identifier that may be of a more temporary nature (i.e., not always true for a particular asset). For example, the asset data platform 102, via the metadata tool, may associate with an asset identifier information regarding the identity of an operator(s) (e.g., driver, engineer, pilot, etc.) of an asset at a given time, the location of an asset at a given time or times, and/or weather conditions experienced by an asset, among various other possibilities.

The metadata tool may be operable to facilitate the association of additional information with an asset identifier in a number of ways. In one example, the metadata tool may be configured to provide various metadata fields and thereby receive user inputs regarding additional data the user desires to be associated with a particular asset identifier. In such an instance, the user may first select an asset or group of assets that they wish to associate additional information with and further enter such additional data via input fields or menu selections. Subsequently, a user may perform an input to submit the additional data entered and/or selected for an asset.

In such an example, the metadata tool may facilitate the transmitting data indicative of the user inputs to the asset data platform 102, which may in turn store in one or more databases the additional information in an entry for an asset identified. In another instance, the asset data platform 102 may store the additional data in a separate entry including a reference to the asset identifier, among other possibilities.

In some examples, various other tools (e.g., those described above, data analysis tool, etc.) may utilize the additional information provided through the metadata tool. In one example, a data analysis tool may be able to search for and retrieve asset-related based at least in part on one or more specified types of additional data (e.g., operator, weather, etc.). For example, a user who wishes to identify asset signal trends based on an individual operator may cause, via a data analysis tool, the asset data platform 102 to retrieve relevant data through a query based in part on the operator name. In another instance, trends may be dynamically identified by the asset data platform 102 based on the additional data associated with the asset identifier. In such a case, the identified trends may be used to prepare and present a visual display of trend data, utilized to generate a maintenance strategy, among various other possibilities. In another instance, a task creation tool may utilize the additional data to populate task fields. Numerous other possibilities exist.

V. CONCLUSION

Example embodiments of the disclosed innovations have been described above. Those skilled in the art will understand, however, that changes and modifications may be made to the embodiments described without departing from the true scope and sprit of the present invention, which will be defined by the claims.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing system comprising:
   a network interface configured to communicatively couple the computing system to (a) a plurality of assets that are each located remote from the computing system and (b) a plurality of client stations that are each running a software application for visualizing asset data handled by the computing system;
   at least one processor;
   a non-transitory computer-readable medium; and
   program instructions stored on the non-transitory computer-readable medium that are executable by the at least one processor to cause the computing system to:
      receive, from a given client station of the plurality of client stations, visualization parameters comprising (i) an asset identifier for a given asset of the plurality of assets and (ii) an event identifier for a given type of asset event related to the operation of the given asset;
      based on the visualization parameters, identify one or more instances of the given type of asset event that occurred at the given asset within a given timeframe in the past;
      identify one or more signal sources of the given asset that are relevant to the identified one or more instances of the given type of asset event that occurred at the given asset;
      for each respective signal source of the identified one or more signal sources, obtain a respective set of signal summary data that was generated by (i) segmenting a sequence of raw signal values generated by the respective signal source into a sequence of time windows of a given duration of time that each comprise multiple raw signal values from the sequence of raw signal values, (ii) for each respective time window in the sequence of time windows, summarizing the multiple raw signal values within the respective time window into a summarized value that is representative of the multiple raw signal values within the respective time window, and (iii) compiling the summarized value for each respective time window in the sequence of time windows into a sequence of summarized values that is less granular than the sequence of raw signal values generated by the respective signal source, wherein the sequence of summarized values comprises the respective set of signal summary data for the respective signal source; and cause the given client station to display a visual representation of the identified one or more instances of the given type of asset event together with the respective set of signal summary data obtained for each respective signal source of the identified one or more signal sources.

2. The computing system of claim 1, wherein the program instructions that are executable by the at least one processor to cause the computing system to cause the given client station to display the visual representation comprise program instructions that are executable by the at least one processor to cause the computing system to cause the given client station to display the visual representation of the identified one or more instances of the asset event and the respective set of signal summary data obtained for each respective signal source of the identified one or more signal sources together on a timeline representing the given timeframe in the past.

3. The computing system of claim 1, wherein the visualization parameters further comprise a timeframe of interest, and wherein the given timeframe in the past comprises the timeframe of interest.

4. The computing system of claim 1, wherein the identified one or more signal sources of the given asset comprise one of a sensor or an actuator of the given asset.

5. The computing system of claim 1, wherein, within the respective set of signal summary data obtained for each respective signal source, the summarized value for each respective time window comprises one of (i) an average of the multiple raw signal values within the respective time window, (ii) a median of the multiple raw signal values within the respective time window, (iii) a maximum of the multiple raw signal values within the respective time window, (iv) a minimum of the multiple raw signal values within the respective time window, (v) a variance of the multiple raw signal values within the respective time window, (vi) an earliest-generated signal value of the multiple raw signal values within the respective time window, or (vii) a latest-generated signal value of the multiple raw signal values within the respective time window.

6. The computing system of claim 1, wherein the program instructions that are executable by the at least one processor to cause the computing system to obtain the respective set of signal summary signal data for each respective signal source of the identified one or more signal sources comprise program instructions that are executable by the at least one processor to cause the computing system to access a database configured to store signal summary data for time windows of only the given duration of time.

7. The computing system of claim 1, wherein the program instructions that are executable by the at least one processor to cause the computing system to obtain the respective set of signal summary data for each respective signal source of the identified one or more signal sources comprise program instructions that are executable by the at least one processor to cause the computing system to access a data structure configured to store signal summary data for time windows of multiple different durations of time, including the given duration of time.

8. The computing system of claim 1, wherein the respective set of signal summary data obtained for each respective signal source of the identified one or more signal sources comprises a first respective set of signal summary data obtained for each respective signal source of the identified one or more signal sources, and wherein the sequence of time windows of the given duration of time comprises a first sequence of time windows of a first duration of time, the computing system further comprising program instructions stored on the non-transitory computer-readable medium that are executable by the at least one processor to cause the computing system to:

after causing the given client station to display the visual representation, receive, from the given client station, an indication of a desired change to the visual representation;

based on the received indication, obtain a second respective set of signal summary data for each respective signal source of the identified one or more signal sources signal data that was generated by (i) segmenting the sequence of raw signal values generated by the respective signal source into a second sequence of time windows of a second duration of time that each comprise multiple raw signal values from the sequence of raw signal values, (ii) for each respective time window in the second sequence of time windows, summarizing the multiple raw signal values within the respective time window into a summarized value that is representative of the multiple raw signal values within the respective time window, and (iii) compiling the summarized value for each respective time window in the second sequence of time windows into a second sequence of summarized values that is less granular than the sequence of raw signal values generated by the respective signal source, wherein the second sequence of summarized values comprises the respective second set of signal summary data for the respective signal source; and cause the given client station to display an updated visual representation of the identified one or more instances of the given type of asset event together with the second respective set of signal summary data obtained for each respective signal source of the identified one or more signal sources.

9. The computing system of claim 8, wherein the indication of the desired change to the visual representation comprises one of:

(i) an indication of a zoom-in request for the visual representation, and wherein the second duration of time is shorter than the first duration of time such that the respective second set of signal summary data for each respective signal source is more granular that the respective first set of signal summary data for each respective signal source; or (ii) an indication of a zoom-out request for the visual representation, and wherein the second duration of time is longer than the first duration of time such that the respective second set of signal summary data for each respective signal source is less granular that the respective first set of signal summary data for each respective signal source.

10. The computing system of claim 8, wherein the program instructions that are executable by the at least one processor to cause the computing system to obtain the first respective set of signal summary data for each respective signal source of the identified one or more signal sources comprise program instructions that are executable by the at least one processor to cause the computing system to access a first database, and wherein the program instructions that are executable by the at least one processor to cause the computing system to obtain the second respective set of signal summary data for each respective signal source of the identified one or more signal sources comprise program instructions that are executable by the at least one processor to cause the computing system to access a second database that differs from the first database.

11. The computing system of claim 8, wherein the program instructions that are executable by the at least one processor to cause the computing system to obtain the first respective set of signal summary data for each respective signal source of the identified one or more signal sources comprise program instructions that are executable by the at least one processor to cause the computing system to access a first set of data entries of a given data structure that correspond to summarized values for time windows of the first duration of time, and wherein the program instructions that are executable by the at least one processor to cause the computing system to obtain the second respective set of signal summary data for each respective signal source of the identified one or more signal sources comprise program instructions that are executable by the at least one processor to cause the computing system to access a second set of data entries of the given data structure that correspond to summarized values for time windows of the second duration of time.

12. The computing system of claim 1, wherein the given duration of time of each respective time window in the sequence of time windows comprises (i) a particular number of seconds per time window, (ii) a particular number of minutes per time window, (iii) a particular number of hours per time window, (iv) a particular number of days per time window, (v) a particular number of weeks per time window, (vi) a particular number of months per time window, or (vii) a particular number of years per time window.

13. A non-transitory computer-readable medium having instructions stored thereon that are executable to cause a computing system to:
receive, from a given client station of a plurality of client stations that are communicatively coupled to the computing system, visualization parameters comprising (a) an asset identifier for a given asset of a plurality of remote assets that are communicatively coupled to the computing system and (b) an event identifier for a given type of asset event related to the operation of the given asset;
based on the visualization parameters, identify one or more instances of the given type of asset event that occurred at the given asset within a given timeframe in the past;
identify one or more signal sources of the given asset that are relevant to the identified one or more instances of the given type of asset event that occurred at the given asset;
for each respective signal source of the identified one or more signal sources, obtain a respective set of signal summary data that was generated by (i) segmenting a sequence of raw signal values generated by the respective signal source into a sequence of time windows of a given duration of time that each comprise multiple raw signal values from the sequence of raw signal values, (ii) for each respective time window in the sequence of time windows, summarizing the multiple raw signal values within the respective time window into a summarized value that is representative of the multiple raw signal values within the respective time window, and (iii) compiling the summarized value for each respective time window in the sequence of time windows into a sequence of summarized values that is less granular than the sequence of raw signal values generated by the respective signal source, wherein the sequence of summarized values comprises the respective set of signal summary data for the respective signal source; and
cause the given client station to display a visual representation of the identified one or more instances of the given type of asset event together with the respective set of signal summary data obtained for each respective signal source of the identified one or more signal sources.

14. The non-transitory computer-readable medium of claim 13, wherein the instructions that are executable to cause the computing system to cause the given client station to display the visual representation comprise instructions that are executable to cause the computing system to cause the given client station to display the visual representation of the identified one or more instances of the asset event and the respective set of signal summary data obtained for each respective signal source of the identified one or more signal sources together on a timeline representing the given timeframe in the past.

15. The non-transitory computer-readable medium of claim 13, wherein the instructions that are executable to cause the computing system to obtain the respective set of signal summary data for each respective signal source of the identified one or more signal sources comprise instructions that are executable to cause the computing system to access a database configured to store signal summary data for time windows of only the given duration of time.

16. The non-transitory computer-readable medium of claim 13, wherein the instructions that are executable to cause the computing system to obtain the respective set of signal summary data for each respective signal source of the identified one or more signal sources comprise instructions that are executable to cause the computing system to access a data structure configured to store signal summary data for time windows of multiple different durations of time, including the given duration of time.

17. A computer-implemented method performed by a computing system that is communicatively coupled to (a) a plurality of assets that are each located remote from the computing system and (b) a plurality of client stations that are each running a software application for visualizing asset data handled by the computing system, the method comprising:
receiving, from a given client station of the plurality of client stations, visualization parameters comprising (i) an asset identifier for a given asset of the plurality of assets and (ii) an event identifier for a given type of asset event related to the operation of the given asset;
based on the visualization parameters, identifying one or more instances of the given type of asset event that occurred at the given asset within a given timeframe in the past;
identifying one or more signal sources of the given asset that are relevant to the identified one or more instances of the given type of asset event that occurred at the given asset;
for each respective signal source of the identified one or more signal sources, obtaining a respective set of signal summary data that was generated by (i) segmenting a sequence of raw signal values generated by the respective signal source into a sequence of time windows of a given duration of time that each comprise multiple raw signal values from the sequence of raw signal values, (ii) for each respective time window in the sequence of time windows, summarizing the multiple raw signal values within the respective time window into a summarized value that is representative of the multiple raw signal values within the respective time window, and (iii) compiling the summarized value for each respective time window in the sequence of time windows into a sequence of summarized values that is less granular than the sequence of raw signal values generated by the respective signal source, wherein the sequence of summarized values comprises the respective set of signal summary data for the respective signal source; and causing the given client station to display a visual representation of the identified one or more instances of the given type of asset event together with the respective set of signal summary data obtained for each respective signal source of the identified one or more signal sources.

18. The method of claim 17, wherein causing the given client station to display the visual representation comprises causing the given client station to display the visual representation of the identified one or more instances of the asset event and the respective set of signal summary data obtained for each respective signal source of the identified one or more signal sources together on a timeline representing the given timeframe in the past.

19. The method of claim 17, wherein the respective set of signal summary data obtained for each respective signal source of the identified one or more signal sources comprises a first respective set of signal summary data obtained for each respective signal source of the identified one or more signal sources, and wherein the sequence of time windows of the given duration of time comprises a first sequence of time windows of a first duration of time, the method further comprising:

after causing the given client station to display the visual representation, receiving, from the given client station, an indication of a desired change to the visual representation;

based on the received indication, obtaining a second respective set of signal summary data for each respective signal source of the identified one or more signal sources signal data that was generated by (i) segmenting the sequence of raw signal values generated by the respective signal source into a second sequence of time windows of a second duration of time that each comprise multiple raw signal values from the sequence of raw signal values, (ii) for each respective time window in the second sequence of time windows, summarizing the multiple raw signal values within the respective time window into a summarized value that is representative of the multiple raw signal values within the respective time window, and (iii) compiling the summarized value for each respective time window in the second sequence of time windows into a second sequence of summarized values that is less granular than the sequence of raw signal values generated by the respective signal source, wherein the second sequence of summarized values comprises the respective second set of signal summary data for the respective signal source; and causing the given client station to display an updated visual representation of the identified one or more instances of the given type of asset event together with the second respective set of signal summary data obtained for each respective signal source of the identified one or more signal sources.

20. The method of claim 19, wherein obtaining the first respective set of signal summary data for each respective signal source of the identified one or more signal sources comprises accessing a first set of data entries of a given data structure that correspond to summarized values for time windows of the first duration of time, and wherein obtaining the second respective set of signal summary data for each respective signal source of the identified one or more signal sources comprises accessing a second set of data entries of the given data structure that correspond to summarized values for time windows of the second duration of time.

* * * * *